(12) United States Patent
Inamura et al.

(10) Patent No.: US 10,464,305 B2
(45) Date of Patent: *Nov. 5, 2019

(54) METHODS AND APPARATUS FOR ADDITIVE MANUFACTURING WITH MOLTEN GLASS

(71) Applicant: Massachusetts Institute of Technology, Cambridge, MA (US)

(72) Inventors: Chikara Inamura, Somerville, MA (US); Daniel Lizardo, Cambridge, MA (US); Michael Stern, Cambridge, MA (US); Peter Houk, Medford, MA (US); Tal Achituv, Needham, MA (US); Neri Oxman, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/879,439

(22) Filed: Jan. 25, 2018

(65) Prior Publication Data

US 2018/0147826 A1    May 31, 2018

Related U.S. Application Data

(63) Continuation of application No. 15/331,898, filed on Oct. 23, 2016, now Pat. No. 9,919,510.

(Continued)

(51) Int. Cl.
*B33Y 50/02* (2015.01)
*B33Y 10/00* (2015.01)
(Continued)

(52) U.S. Cl.
CPC ............... *B33Y 50/02* (2014.12); *B33Y 10/00* (2014.12); *B33Y 30/00* (2014.12); *C03B 19/025* (2013.01)

(58) Field of Classification Search
CPC ....... C03B 19/01; C03B 19/02; C03B 19/025; B29C 64/106; B29C 64/20; B29C 64/118; B29C 64/209
See application file for complete search history.

(56) References Cited

U.S. PATENT DOCUMENTS

| 2,047,173 A | 7/1936 | Bates |
| 5,402,351 A | 3/1995 | Batchhelder |

(Continued)

OTHER PUBLICATIONS

Khoshnevis, B., et al., Automated Construction using Contour Crafting, published in Proceedings of 2004 IIE Annual Conference, pp. 497-504 (2004).

(Continued)

*Primary Examiner* — Joseph S Del Sole
*Assistant Examiner* — Mohamed K Ahmed Ali
(74) *Attorney, Agent, or Firm* — Stephen R. Otis

(57) ABSTRACT

A nozzle deposits a filament of viscous, molten glass onto a print bed, while the print bed rotates about a vertical axis and translates in x, y, and z directions. The deposition is computer controlled, such that the resulting deposited filament forms a desired glass object that is solid after it anneals. One or more motors rotate the print bed such that the direction of deposition of the molten glass is constant relative to the nozzle, even though the print bed is translating in different directions relative to the nozzle. Keeping the direction of deposition constant relative to the nozzle tends to prevent the extruded filament of molten glass from experiencing large, changing, tensile and shear forces that would otherwise occur and that would otherwise damage the filament.

18 Claims, 17 Drawing Sheets

Related U.S. Application Data

(60) Provisional application No. 62/321,387, filed on Apr. 12, 2016.

(51) Int. Cl.
    *B33Y 30/00*     (2015.01)
    *C03B 19/02*     (2006.01)

(56) References Cited

U.S. PATENT DOCUMENTS

| | | |
|---|---|---|
| 7,814,937 B2 | 10/2010 | Khoshnevis |
| 2002/0002843 A1 | 1/2002 | Gotoh et al. |
| 2005/0194401 A1 | 9/2005 | Khoshnevis |
| 2010/0025349 A1 | 2/2010 | Khoshnevis |
| 2014/0210137 A1 | 7/2014 | Patterson et al. |

OTHER PUBLICATIONS

Khoshnevis, B., et al., Mega-scale fabrication by Contour Crafting, published in International Journal of Industrial and Systems Engineering, vol. 1, Issue 3 (2006), pp. 301-320.

Mendes, N., et al., Discretization and fitting of nominal data for autonomous robots, published in Expert Systems with Applications, 40(4), pp. 1143-1151 (2013).

Skylar-Scott, M., et al., Laser-assisted direct ink writing of planar and 3D metal architectures, published in Proceedings of the National Academy of Sciences of the United States of America, PNAS, May 31, 2016, vol. 113, No. 22, pp. 6137-6142 and Supporting Information 10.1073/pnas.1525131113.

WYSS Institute, Printing metal in midair, published at http://wyss.harvard.edu/viewpressrelease/257, May 16, 2016.

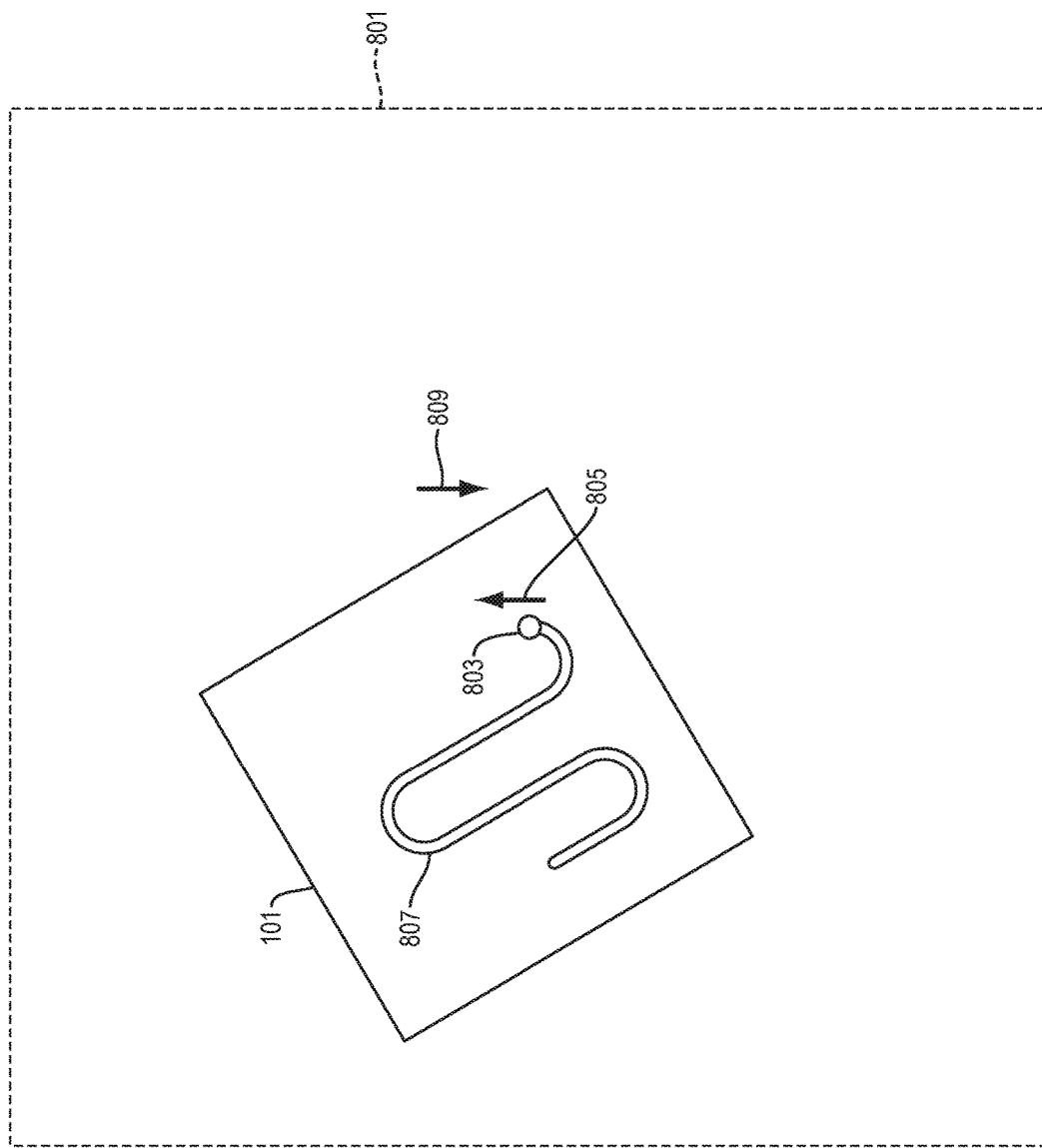

METHODS AND APPARATUS FOR ADDITIVE MANUFACTURING WITH MOLTEN GLASS

RELATED APPLICATIONS

This application is a continuation of U.S. application Ser. No. 15/331,898 filed Oct. 23, 2016, which claims the benefit of U.S. Provisional Application No. 62/321,387 filed Apr. 12, 2016.

FIELD OF TECHNOLOGY

The present invention relates generally to additive manufacturing with molten glass.

COMPUTER PROGRAM LISTING

Attached are fourteen computer program files, each created as a .txt file on Oct. 14, 2016: (1) G3P_V2_Rhino_GH_SurfaceSlicer.txt with a size of about 3 KB; (2) G3P_V2_Rhino_GH_Bi-TangentArc.txt with a size of about 10 KB; (3) G3P_V2_Rhino_GH_Bi-TangentArc_with_RotationalBifurcation.txt with a size of about 18 KB; (4) G3P_V2_Rhino_GH_LinearTranslationAlongZ-Axis.txt with a size of about 2 KB; (5) G3P_V2_Rhino_GH_CurveDiscretization.txt with a size of about 2 KB; (6) G3P_V2_Rhino_GH 4Axis_Transformation.txt with a size of about 12 KB; (7) G3P_V2_Rhino_GH_SpiralInterpolation.txt with a size of about 3 KB; (8) G3P_V2_Rhino_GH_4Axis_Geode_Generation.txt with a size of about 4 KB; (9) G3P_V2_Chilipeppr_04.txt with a size of about 4 KB; (10) G3P_V2_Chilipeppr_02.txt with a size of about 9 KB; (11) G3P_V2_Chilipeppr_03.txt with a size of about 1 KB; (12) G3P_V2_Chilipeppr_04.txt with a size of about 4 KB; (13) G3P_V2_Firmware_MotorMonitor_h.txt with a size of about 1 KB; and (14) G3P_V2_Firmware_MotorMonitor_cpp.txt with a size of about 5 KB. These fourteen computer program files comprise source code for software employed in a prototype implementation of this invention. These fourteen computer program files are each incorporated by reference herein.

SUMMARY

In illustrative implementations of this invention, a fabrication system ("glass 3D printer") fabricates glass objects. The glass 3D printer may include a stationary nozzle and a moving print bed. The nozzle may deposit a filament of viscous, molten glass onto a print bed, while the print bed rotates about a vertical axis and translates in x, y, and z directions. The deposition is computer controlled, such that the resulting deposited filament forms a desired glass object.

This invention solves a technological problem that tends to occur under the extreme temperature conditions of fabricating with molten glass. Under these extreme conditions, the extruded molten glass filament remains viscous for a period of time after being extruded from the nozzle. During the time that the molten glass filament remains viscous after being extruded, the filament is subject to being damaged by large, changing forces exerted by the nozzle on the filament if the direction of deposition of the molten glass changes with respect to the orientation of the nozzle.

Thermoplastic polymer (such as ABS or PLA) filaments that are used in conventional fused deposition model (FDM) based 3D printers require much lower operation temperature during their deposition. They are also much smaller in size in terms of the cross-sectional area. This combination of lower operation temperature and smaller thermal mass allows these FDM filaments to cool down in a much shorter period of time and therefore provides a greater degree of flexibility in printing free-form geometry without being damaged.

In contrast, for molten glass extrusion, given the higher operation temperature and larger filament diameter, cooling rates are typically much slower and the time in which the filament stays viscous and prone to damage is longer. For molten glass printing, due to its relatively large filament size and its thermal inertia, it takes long time (over a period of minutes) before the filament cools down. During this cooling period, any external forces the filament experiences may cause a delayed response due to the high viscosity of the molten glass or internal shear forces in the molten glass.

Thus, for molten glass printing, the following technological problem occurs, unless corrective action is taken: The extruded, viscoelastic filament of molten glass is subjected to large, changing tensile and shear forces. These large, changing forces are created by the print bed (on which the extruded filament is resting) moving in changing directions relative to the nozzle. These large, changing forces may create defects in the still viscous filament of molten glass—and may even cause layers of extruded molten glass to separate from each other.

This technological problem (of large, changing shear and tensile forces due to the print bed moving in changing directions relative to the nozzle) is exacerbated by the fact that during 3D fabrication with molten glass, the nozzle tends to "smear" as hardened glass builds up on the nozzle. Molten glass tends to adhere to many types of material, including glass itself. This smearing causes the nozzle to become asymmetrical and becomes a part of effective nozzle profile during the deposition of the molten glass. As the moving print bed changes direction, the cross-sectional shape of the asymmetrical nozzle—in a cross-sectional plane perpendicular to the direction of movement of the print bed—changes as the print bed changes direction relative to the asymmetrical nozzle. This causes tensile and shear forces exerted by the nozzle on the extruded glass filament to change sharply as the print bed moves in different directions relative to the nozzle.

Unless corrective action is taken, these large forces change direction over time with respect to parts of the filament that remain soft (as the print bed moves in changing directions relative to the nozzle), creating mild to catastrophic defects in the filament.

The following is a non-limiting example of the above technological problem that would occur, if corrective action were not taken. In this example: (a) hardened glass builds up asymmetrically on the nozzle, causing the shape of the nozzle to be "smeared"; (b) the print bed moves in a first horizontal direction relative to a stationary nozzle, and then moves in a curving horizontal trajectory until it is moving in a second horizontal direction at a ninety degree angle from the first direction; (c) the asymmetrical buildup on the nozzle causes the nozzle to have a changing cross-section (in a cross-sectional plane that is perpendicular to the then current direction of travel of the print bed) as the print bed changes direction relative to the nozzle; and (d) the changing direction of motion of the print bed relative to the nozzle, and the changing cross-section of the nozzle (perpendicular to the then current direction of travel of the print bed), taken together, cause large, changing forces to be exerted on the viscoelastic filament of molten glass, which lead to print defects.

In illustrative implementations of this invention, these problems are greatly mitigated by the following corrective measure: A motor rotates the print bed to keep the direction of deposition at a constant angle relative to the stationary nozzle, even while the print bed is translated in different directions relative to the nozzle. Specifically, motors cause the print bed to rotate, while the print bed translates in x, y or z directions. The rotation of the print bed keeps the direction of deposition (i.e., the horizontal direction in which the molten filament is being deposited on the print bed) constant relative to the nozzle. The print bed rotates about a vertical axis that intersects a point in the print bed (such as a point that is the horizontal centroid of the print bed).

This corrective measure (rotating the print bed to keep the direction of deposition constant relative to the nozzle) solves (or greatly mitigates) the above technological problem for at least two reasons: First, because the direction of deposition does not change relative to the nozzle, the forces exerted by the nozzle on the extruded filament (which are usually primarily along the longitudinal axis of the filament) are constant in direction. The feed rate may also be kept constant. Keeping the feed rate constant and the direction of deposition (relative to the nozzle) constant may cause the forces exerted by the nozzle on the filament to be constant in magnitude and direction, and thus prevent layers of filament from being pulled apart from each other. Second, if asymmetrical buildup occurs on the nozzle, the nozzle's cross-section (perpendicular to the direction of motion) does not change as a result of changes in the trajectory of the print bed—because the print bed is rotated to keep the direction of deposition constant relative to the nozzle.

Thus, in illustrative implementations of this invention, a corrective measure is taken: One or motors rotate the print bed about a vertical axis that intersects the print bed, while translating the print bed in x, y and z directions. The rotation causes the direction of deposition to be constant relative to the nozzle, despite the fact that the print bed is translating in different directions relative to the nozzle. This tends to prevent the nozzle from exerting changing forces on the filament that would otherwise occur (and damage the extruded filament) if this corrective measure were not taken.

In illustrative implementations, the glass 3D printer includes heating/cooling hardware and motion actuators. The heating/cooling hardware comprises: (a) a crucible kiln for heating feed stock into molten glass; (b) a nozzle kiln and gas torch/compressed air system for heating or cooling the nozzle; and (c) a build chamber kiln for keeping the extruded, molten glass at a high temperature during the build process (deposition of filament). These heating/cooling components are physically independent but digitally integrated using a central thermal profile control system. The crucible kiln, nozzle kiln and nozzle are each positioned above the print bed and the actuators for the print bed. The motion actuators comprise a four-axis CNC motion system that actuates the print bed to move in three Cartesian spatial dimensions (x, y, z) and to rotate about a vertical axis.

In illustrative implementations, the glass 3D printer may provide at least seven degrees of control in the deposition of glass materials: four degrees of motion control (x, y, z, and rotation about a vertical axis), and three degrees of temperature/viscosity control. These seven degrees of freedom may be addressed with custom designed G-codes that map the desired temperature across the manufacturing platform to each point of any given geometry in space as it generates the motion path of the platform.

In illustrative implementations of this invention, the glass 3D printer includes an integrated digital thermal control system, with one processing unit addressing the melting zone (in the crucible kiln), the flow control zone (in the nozzle kiln), and the build zone (in the build chamber kiln). The thermal control is also integrated with the motion control. One or more computers may perform integrated motion and temperature control in such a manner as to control, and to change, viscosity during fabrication of a single glass object. Changing the viscosity allows for printing different degrees of curvature, overhang, cross-section profile, and print speeds.

In illustrative implementations, the glass 3D printer includes a multifunctional nozzle assembly. The nozzle assembly includes a resistive, concentric heating element to control temperature of the nozzle, a concentric gas torch that doubles as a compressed air nozzle for even faster temperature manipulation of the nozzle (also used as a start and stop control), and a set of automated shears for mechanical manipulation of material. Controlling the nozzle temperature helps to control the temperature, and thus the viscosity, of the molten glass being extruded through the nozzle.

The description of the present invention in the Summary and Abstract sections hereof is just a summary. It is intended only to give a general introduction to some illustrative implementations of this invention. It does not describe all of the details and variations of this invention. Likewise, the description of this invention in the Field of Technology section is not limiting; instead it identifies, in a general, non-exclusive manner, a technology to which exemplary implementations of this invention generally relate. Likewise, the Title of this document does not limit the invention in any way; instead the Title is merely a general, non-exclusive way of referring to this invention. This invention may be implemented in many other ways.

BRIEF DESCRIPTION OF THE DRAWINGS

FIG. 6A lists material handling steps that occur in the method. FIG. 6B lists thermal control steps that occur in the method. FIG. 6C lists motion control steps that occur in the method.

FIGS. 8 and 9 show an example of rotating a print bed to keep the direction of deposition constant relative to the nozzle. FIG. 8 shows the print bed's position at an earlier time than FIG. 9 does.

FIG. 10A shows a bottom view of the "smeared" nozzle. FIG. 10B shows how a viscoelastic filament deposited in a circular path by the "smeared" nozzle would change in width at different points in the path.

FIG. 11A shows a bottom view of the rectangular nozzle. FIG. 11B shows how a viscoelastic filament deposited in a circular path by the rectangular nozzle would change in width at different points in the path.

FIG. 12A shows a bottom view of the double-orifice nozzle. FIG. 12B shows how a viscoelastic filament deposited in a circular path by the double-orifice nozzle would change in width at different points in the path.

In FIGS. 13A, 13B, 13C, the nozzle is asymmetrical. In FIGS. 13A, 13B, 13C, the nozzle has a "smeared" shape, a rectangular shape and double-orifice shape, respectively.

FIGS. 13A, 13B, 13C show that a viscoelastic filament deposited in a circular path has a constant width—if the print bed is rotated to keep the direction of deposition at a constant angle relative to the stationary nozzle.

The above Figures show some illustrative implementations of this invention, or provide information that relates to those implementations. However, this invention may be implemented in many other ways.

DETAILED DESCRIPTION

In illustrative implementations of this invention, a glass 3D printer 200 extrudes a viscoelastic filament of molten glass, while rotating and translating a print bed. The motion of the print bed during the extrusion causes the filament to be deposited in a spatial pattern so as to fabricate a desired glass object.

Figure 1:
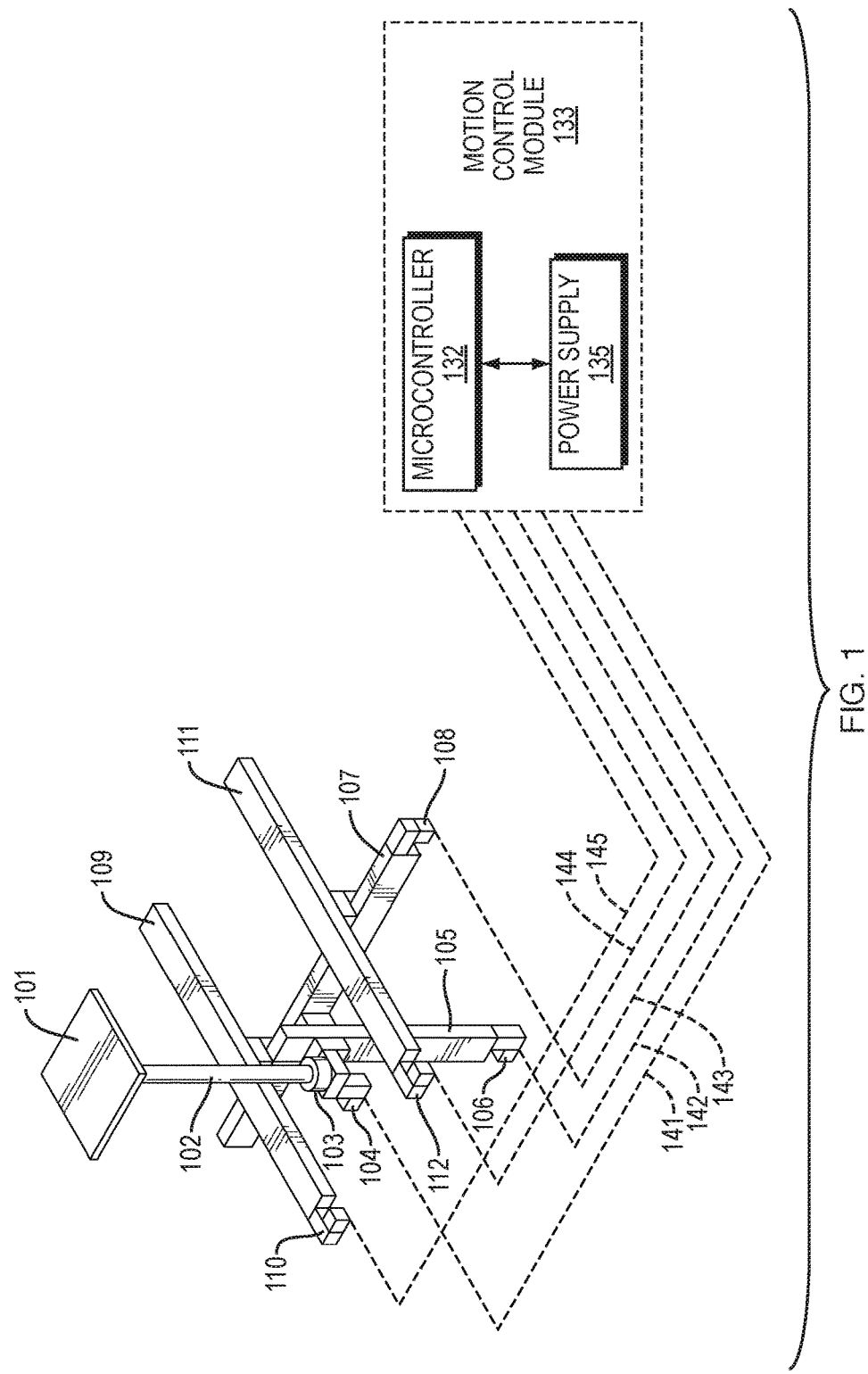
FIG. 1 shows hardware for actuating movement of a print bed.

FIG. 1 shows hardware for actuating movement of a print bed, in an illustrative implementation of this invention. Five servo motors 104, 106, 108, 110, 112, taken together, actuate linear motion of the print bed 101 in x, y and z Cartesian directions and actuate rotation of the print bed 101. The print bed 101 is supported by a vertical support tube 102, which rests on a rotary table 103. The print bed 101, vertical support tube 102 and the rotary table 103 each rotate about a vertical axis that intersects the center of the print bed 101. The vertical axis coincides with a longitudinal axis of the vertical support tube 102. This vertical axis (about which the print bed rotates) is sometimes referred to herein as the "A-axis". As the print bed moves in the x and y directions, the position of the A-axis (relative to the nozzle) changes. Servo motor 104 actuates the rotation (of the print bed, vertical support and rotary table) about the A-axis. Two servo motors 110, 112 actuate x-axis horizontal motion of the print bed 101, and two linear motion guides 109, 111 guide this x-axis motion. Servo motor 108 actuates y-axis horizontal motion of the print bed 111, and linear motion guide 107 guides this y-axis motion. Servo motor 112 actuates z-axis vertical motion of the print bed, and linear motion guide 105 guides this z-axis motion. Each of the linear motion guides may include one or more ball bearings.

In the example shown in FIG. 1, the five servo motors 104, 106, 108, 110, 112 may be controlled by, and provide feedback to, microcontroller 132. This microcontroller may be housed in a separate motor control module 133. The motor control module 133 may include power supply hardware 135 that supplies power to the respective servo motors. Microcontroller 132 may control this power supply hardware 135, and thus control the power supplied to the respective servo motors. Cables 141, 142, 143, 144, 145 to each of the five motors, respectively, include wires for transmitting data and other wires for transmitting power. In FIG. 1, microcontroller 132 sends identical control signals to control both of the x-axis motors 110, 112.

In illustrative implementations, each of the five servo motors is a brushless servo motor with embedded encoder and embedded servo drive. The embedded servo drive for each motor outputs a real-time feedback signal that specifies the motor's position, velocity, torque, and error count at any given time. All five motors may be communicatively connected to a single microprocessor (e.g., 132) that receives the real-time feedback signals from the five motors and thereby monitors the individual state of each motor. This microprocessor may be communicatively connected to a Chilipeppr interface to achieve a complete closed-loop dataflow between a G-code processor and each individual motor.

In illustrative implementations of this invention, four axis motion control is well-suited for handling the viscoelasticity of molten stock material. In some cases, not only is a point in the path given three position vectors (in Cartesian x, y, and z directions) but also an angular dimension is applied to the nozzle and this is pinned to the tangent vector of the design itself. In doing this, any forces applied to the soft filament by the extrusion head will pull along its major axis at every point, allowing for dampening of the force without moving the filament from its position. In some implementations, any forces applied by randomly distributed excess glass on the nozzle tip will be subject to that directional constraint.

The glass 3D printer may include at least three actuators for linear orthogonal motion in x axis, y axis, and z axis, and one rotary print bed for angular motion about a vertical axis, and may be driven by any type of motion generators (electric motors translated by screws or belts, linear motors, pneumatic actuators, etc.) and by any four-axis motion control system.

In a prototype of this invention: (a) the prototype hardware includes four 450 mm stroke linear rails housing precision ground ball screws and one geared rotary table; (b) all five motion stages are driven by 0.3 hp servomotors controlled by a multi-axis open source motor driver; (c) the motion and control translate to the four axis positioning of the print bed itself and by extension, the extruded glass part, leaving no motion assigned to the extrusion head; and (d) this contributes to the minimization of unpredictable viscous flow by reducing the amount of molten material that undergoes any acceleration.

Figure 2:
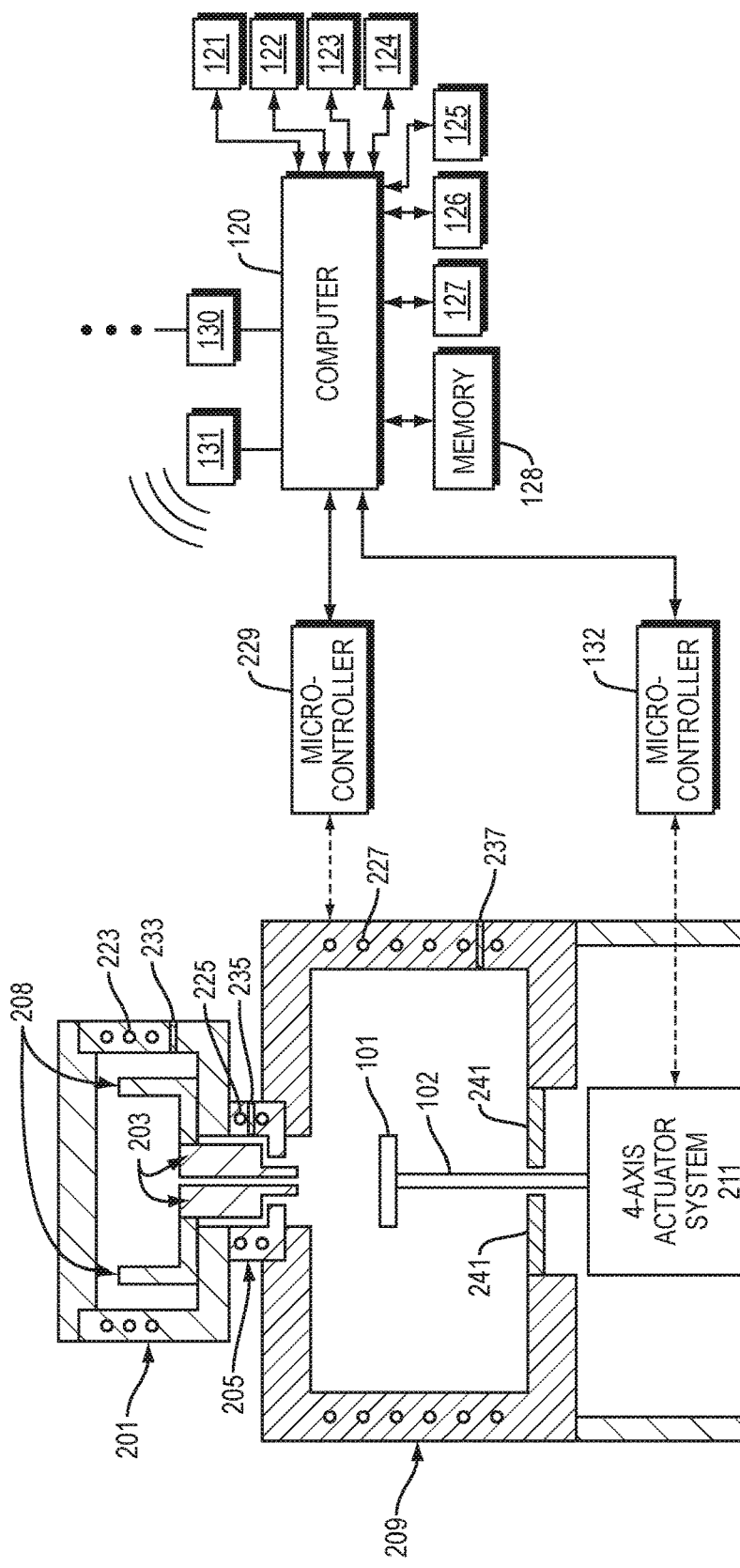
FIG. 2 shows an apparatus for 3D printing with molten glass.

FIG. 2 shows apparatus for 3D printing with molten, viscous glass, in an illustrative implementation of this invention. In FIG. 2, a crucible kiln 201 melts the glass. The crucible kiln is sometimes referred to herein as a "melter kiln". A crucible 208 is located inside the crucible kiln and holds glass (e.g., molten glass). A nozzle assembly 203 includes a nozzle for extruding a filament of viscous, molten glass, a gas torch/compressed air system for heating and cooling the nozzle, and shears for cutting the filament. A nozzle kiln 205 surrounds the nozzle assembly 203 and provides additional temperature control for the nozzle assembly. The nozzle deposits a filament of molten glass unto the print bed 101. A build chamber kiln 209 surrounds the print bed 101 and the molten glass that is deposited on the print bed. The build chamber kiln 209 keeps the deposited glass at a high temperature during the build process (as successive layers of viscous glass are deposited). In some implementations, the build chamber kiln is also used for annealing (and thus also functions as an annealing kiln). During annealing, the temperature of the glass is slowly lowered over a period of hours, as internal stress (due to internal temperature gradients) is relieved. Alternatively, in some cases, annealing may be performed in a separate annealing kiln, which is separate from the build chamber kiln. This allows for another 3D print to begin, without waiting for the annealing to be completed.

In FIG. 2, a four-axis actuation system 211 actuates x, y, z and rotary motion of the print bed 101. The actuation system 211 includes servo motors and linear motion guides. A microcontroller 132 controls the servo motors. An insulative skirt 241 at the bottom of the build chamber kiln 209 protects the actuation system 211 from the heat of the build chamber kiln. The protective skirt 241 fits closely around the vertical tube 102 that supports the printer bed 101, and accommodates movement of the vertical tube 102 (which moves in order to translate and rotate the print bed 101).

In FIG. 2, heating elements (e.g., 223, 225, 227) are located in the walls of the crucible kiln 201, nozzle kiln 205, and build chamber kiln 209, respectively. The heating elements heat these three kilns. A microcontroller 229 controls the heating elements (e.g., 223, 225, 227) in the walls of the kilns. Thermocouples 233, 235, 237 measure temperature of the kilns, and output temperature readings that provide feedback to microcontroller 229.

In some implementations, the microcontroller 229 performs a proportional integral derivative (PID) algorithm that: (a) controls the power supplied to heating elements located in or adjacent to the walls of the kilns; and (b) controls the power supplied to a resistive heating element (e.g., 303, shown in FIG. 3) that directly surrounds the nozzle. The microcontroller 229 may control the gas torch/ compressed air system that heats and cools the nozzle (e.g., by turning that system on and off). Alternatively, a set of multiple microcontrollers may perform these functions.

In FIG. 2, a computer 120 controls and interfaces with microcontrollers 132, 229. Computer 120 also controls one or more input/output (I/O) devices that output information in a form that is perceptible to a human, such as a touch screen 125, a speaker 126, or a computer monitor screen 127. The computer 120 controls and interfaces with one or more I/O devices that receive input from a human user, such as a keyboard 121, mouse 122, microphone 123, camera 124, and touch screen 125. The computer 120 may interface with (i) a wireless communication module 130, (ii) a network communication module 131 for communication over a wire or fiber-optic link, or (iii) both. The computer 120 may store data in and retrieve data from a memory device 128.

In illustrative implementations, one or more computers perform integrated temperature control in multiple regions, including the melting zone, flow control zone, build zone, and (in those cases in which a separate annealing chamber is used) an annealing zone. The parameters for temperature control for each of the temperature zones may include: set temperature (i.e., target temperature), ramp rate, current temperature, and PID control parameters. In some implementations, a kiln may contain multiple, separately controlled temperature zone that are vertically stacked. For example, for a large print project, the temperature in a top region of the build chamber may be set or ramped differently than in a lower region of the build chamber.

In illustrative implementations, the glass 3D printer includes an integrated digital thermal control system, with one processing unit addressing the multiple zones, including the melting zone (in the crucible kiln), the flow control zone (in the nozzle kiln), the build zone (in the build chamber kiln) and, if a separate annealing chamber is employed, an annealing zone. The temperature control system takes multiple temperature inputs per zone, and outputs a PID duty cycle for the power supplied to the heating elements. This allows for precise temperature and viscosity control throughout the fabrication process. Furthermore, the temperature control may also be integrated into the design geometry as another toolpath parameter. A point in the toolpath may also provide a temperature or viscosity designation, and the motor control system may address the PID control for the heating system in any zone and synchronously with four axis position.

In illustrative implementations, filament profile shape, layer adhesion, and internal stress may all be controlled through temperature/viscosity. This temperature control may facilitate 3D printing with molten glass: (a) to form complex flying truss forms between layered filaments; (b) to control curvature of each filament and thus to control optical properties of each filament; or (c) to create other complex thermally dependent geometries. In some cases, the temperature control system causes a mismatch between the internal temperature and surface temperature of deposited glass, in order to produce tempered glass. (Advantageously, tempered glass may be stronger than un-tempered glass).

In some implementations, material properties of the glass may vary spatially within the glass, and a computer may assign material properties to voxels. By spatially varying material properties or by varying temperature, the glass 3D printer may achieve a wide range of effects. For example, for a given viscosity, the working temperature for colored glass may be different than for clear glass. Thus, the temperature for colored glass may be different than for clear glass, in order to achieve the same viscosity. Or temperatures may be matched while viscosities (of the clear glass and colored glass) differ, allowing for different kinds of features in the same print job.

In a prototype of this invention, power management is centralized a Watlow® EZ-Zone RM Integrated Controller from Watlow. The EZ-Zone RM Integrated Controller is a scalable architecture with its modular system and accommodates a communication with various I/O (input/output) interfaces.

The glass 3D printer may include a touch screen (e.g., 125) that displays front end single cohesive UI (user interface) for thermal control.

In illustrative implementations, the glass 3D printer may include a multifunctional nozzle assembly that facilitates accurate flow control at high temperatures (up to 1200° C.). The glass 3D printer may also include auxiliary rapid heating and rapid cooling equipment in the form of gas torches and forced air, and a mechanical shearing mechanism, for additional filament manipulation. The nozzle may comprise alumina. The nozzle may be surrounded by a silicon carbide resistive tube heater providing fast response primarily by radiant heating. Temperature of the face and orifice of the nozzle may be rapidly changed by auxiliary equipment in the form of a concentric ring of gas burning torches and a concentric ring of compressed air nozzles. The addition of a torch based heating mechanism and a compressed air based cooling system may provide the capability to induce fast thermal changes in the system. This heating/ cooling mechanism for the nozzle assembly has at least two benefits. First, it may rapidly heat and cool molten glass in the nozzle assembly, and thereby control rate of flow of molten glass through the nozzle (including starting or stopping the flow of molten glass through the nozzle). Second, the positive heat flux from the gas burning torches (or negative from compressed air) may be applied in addition to the heat flux from the nozzle kiln heating elements to more precisely control the thermal history of each voxel of material that is printed. In a prototype of this invention, the heating and cooling elements for the nozzle assembly are structurally supported by a ceramic-glass fiber composite fitted into a silicon carbide plate. These may be high temperature structural ceramic materials used to prevent thermal degradation or creep in the glass melting environment, and thus may ensure consistent position accuracy for the nozzle assembly over the life of the machine. As a mechanical actuator for flow control, automated shears may be used on the glass filament just below the nozzle to separate (e.g., at the end of a build) stock material in the nozzle from the solidifying part.

Figure 3:
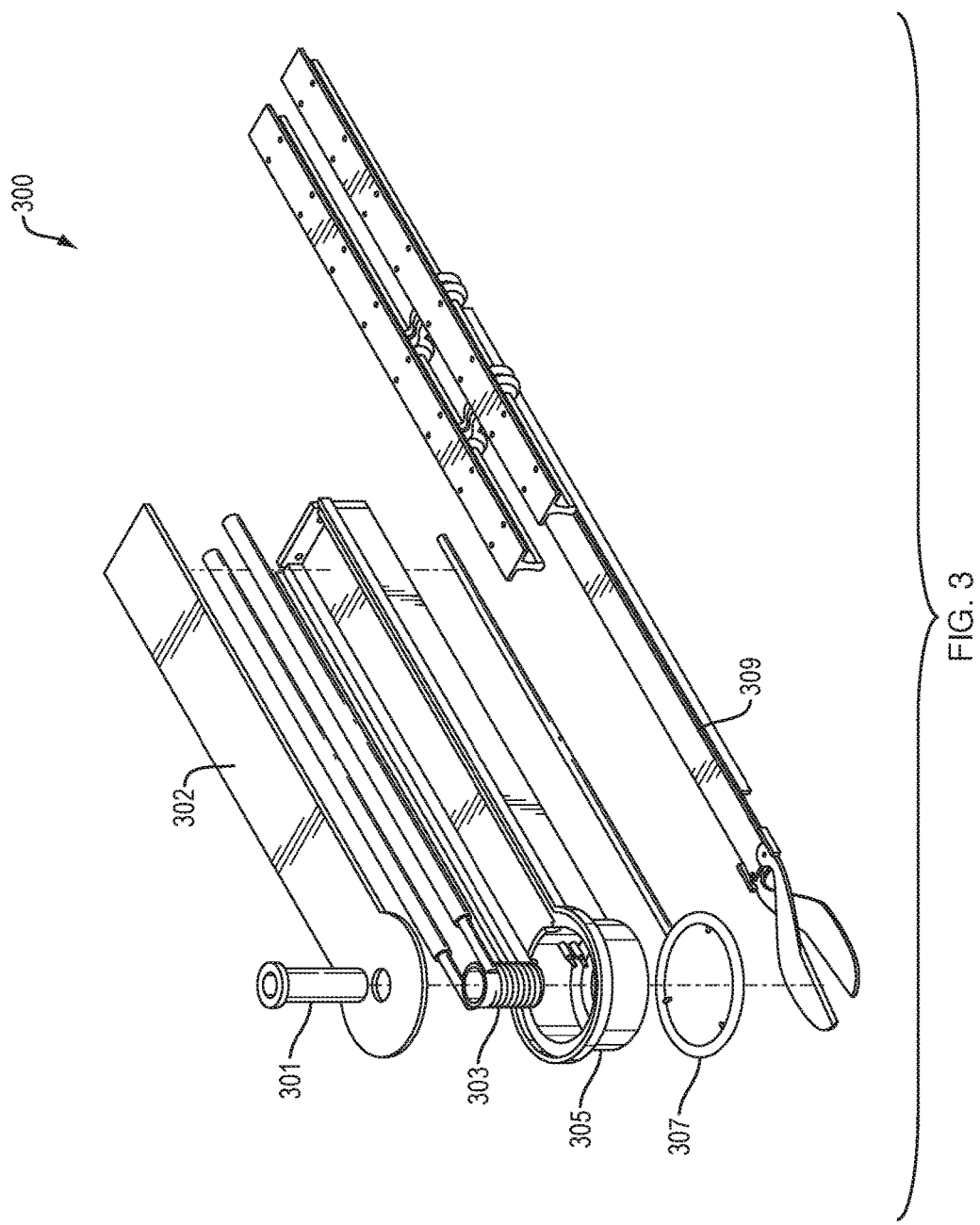
FIG. 3 shows an exploded view of a nozzle assembly.

FIG. 3 shows an exploded view of, among other things, a nozzle assembly, in an illustrative implementation of this invention. In FIG. 3, nozzle assembly 300 comprises materials (including refractory materials) that are well-suited to operate at high temperatures. The nozzle assembly 300 includes a ceramic nozzle 301 and a support member 302 that supports the nozzle. A silicon carbon resistive heating element 303 heats the nozzle. A ceramic fiber composite housing 305 houses the nozzle 301, support member 302 and heating element 303. Tubing 307 has a dual functionality: (a) at some times, it functions a concentric gas torch for heating the nozzle and (b) at other times, it functions as a compressed air delivery system for cooling the nozzle. Automated shears 309 may cut the filament that is extruded by the nozzle. For example, at the completion of a build for a glass object, the shears 309 may cut the extruded filament, to separate the glass in the nozzle from the deposited glass that forms the fabricated object. The nozzle assembly 300 may be located inside the nozzle kiln 205 that is shown in FIG. 2.

In some implementations, the gas nozzle is used to remove built-up glass from the nozzle. To do so, the gas torch at times heats the nozzle sufficiently to melt glass that has built up on the nozzle.

Figure 4:
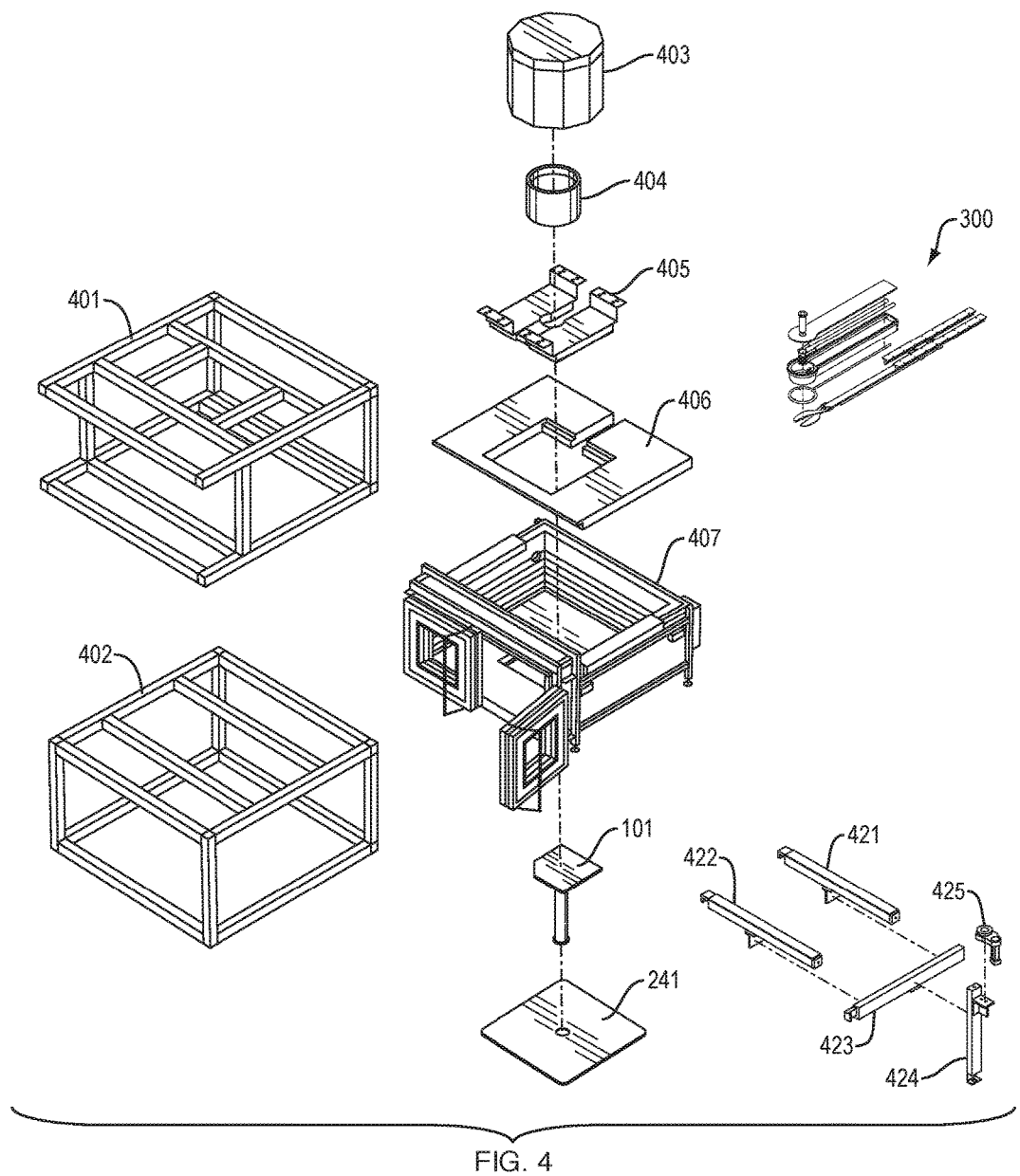
FIG. 4 shows an exploded view of hardware for a 3D glass printer.

FIG. 4 shows an exploded view of hardware for a 3D glass printer, in an illustrative implementation of this invention. The glass 3D printer includes an upper support frame 401 and a lower support frame 402. A heating system 403 surrounds a melt chamber 404. A nozzle heating superstructure 405 surrounds a nozzle assembly 300. An insulation panel 406 is located between the melt chamber and build chamber. A heated build chamber 407 surrounds a print bed 101. An insulative skirt 241 fits around the vertical support for the print bed 101 and separates the heated build chamber 407 from an actuator system that actuates motion of the print bed. The heated build chamber 407 is located above the actuator system. The actuator system includes two x-axis actuators 421, 422, an y-axis actuator 423, and a z-axis actuator 424. The x-axis, y-axis, and z-axis actuators each include a servo motor and a linear motion guide with one or more ball bearings. The actuator system also includes an "A-axis" actuator 425 for actuating rotation of the print bed about a vertical "A-axis" that intersects the print bed. The A-axis actuator 425 includes a server motor and a rotary table.

Figure 5:
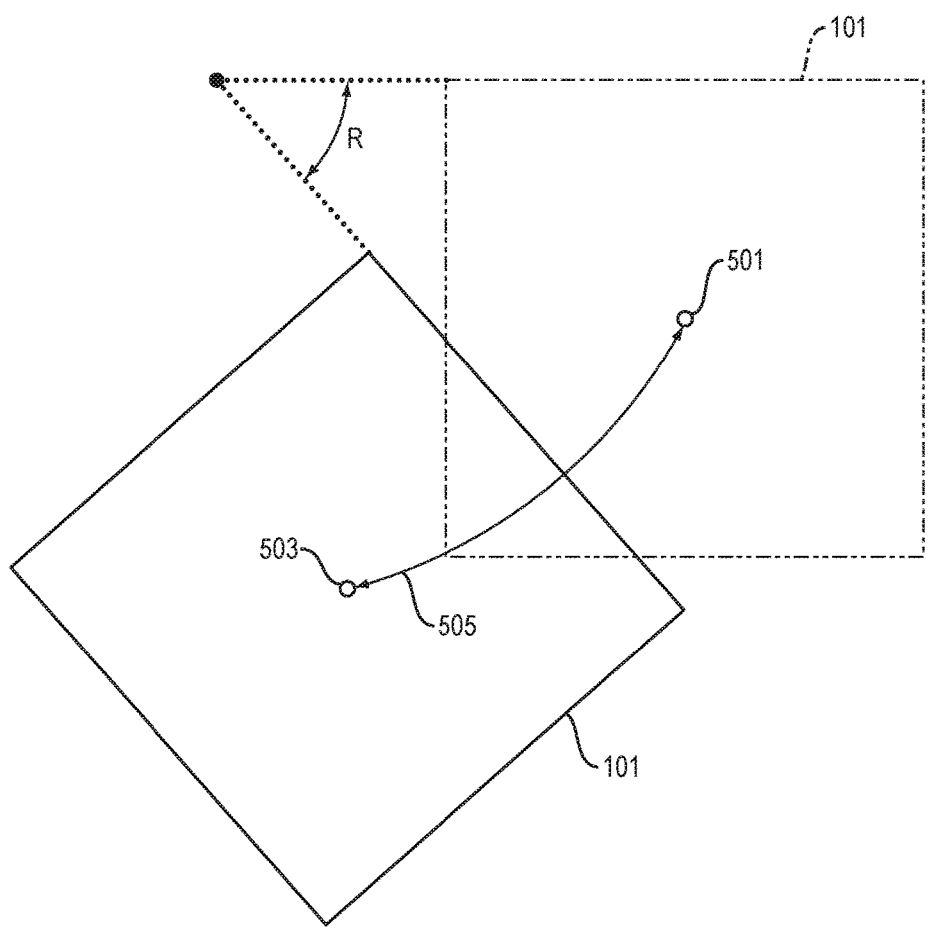
FIG. 5 shows an example of print bed motion.

FIG. 5 shows an example of both translational and rotational motion of a print bed, in an illustrative implementation of this invention. In FIG. 5, a print bed 101 is translated from an initial position at an initial time, to a later position at a later time. In FIG. 5, the dashed lines indicate the initial position of the print bed 101, and the solid lines indicate the later position of the print bed 101. The horizontal centroid of the print bed is located at point 501 at the initial time and at point 503 at the later time.

In the example shown in FIG. 5, the print bed 101 undergoes horizontal translation in both the x-axis and y-axis direction, as it travels from the initial position to the later position. In the top view of FIG. 5, this horizontal translation appears to move the centroid of the print bed down and to the left in FIG. 5. Arrow 505 shows the trajectory of the print bed's centroid (relative to an external fixed position) as the centroid undergoes horizontal translation from point 501 at the initial time to point 503 at the later time.

In the example shown in FIG. 5, the print bed rotates at the same time that it undergoes horizontal translation. The rotation causes the horizontal angular orientation of print bed to change by angle R. The rotation is about a vertical axis that intersects the horizontal centroid of the print bed 101. In the top view shown in FIG. 5, the print bed appears to rotate clockwise about its centroid as it translates down and to the left.

Figure 6A:
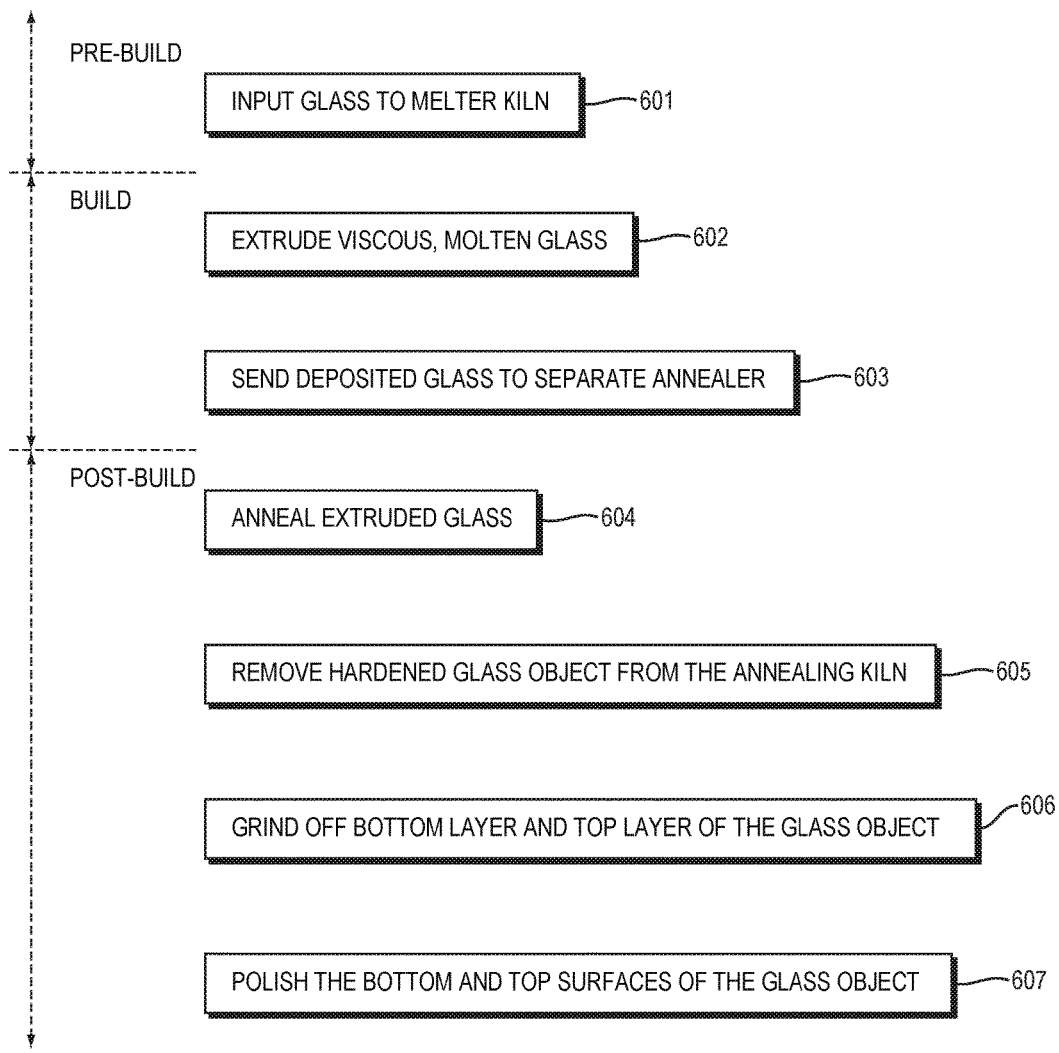
FIGS. 6A, 6B and 6C, taken together, are a flowchart for an overall process of glass 3D printing.
Figure 6B:
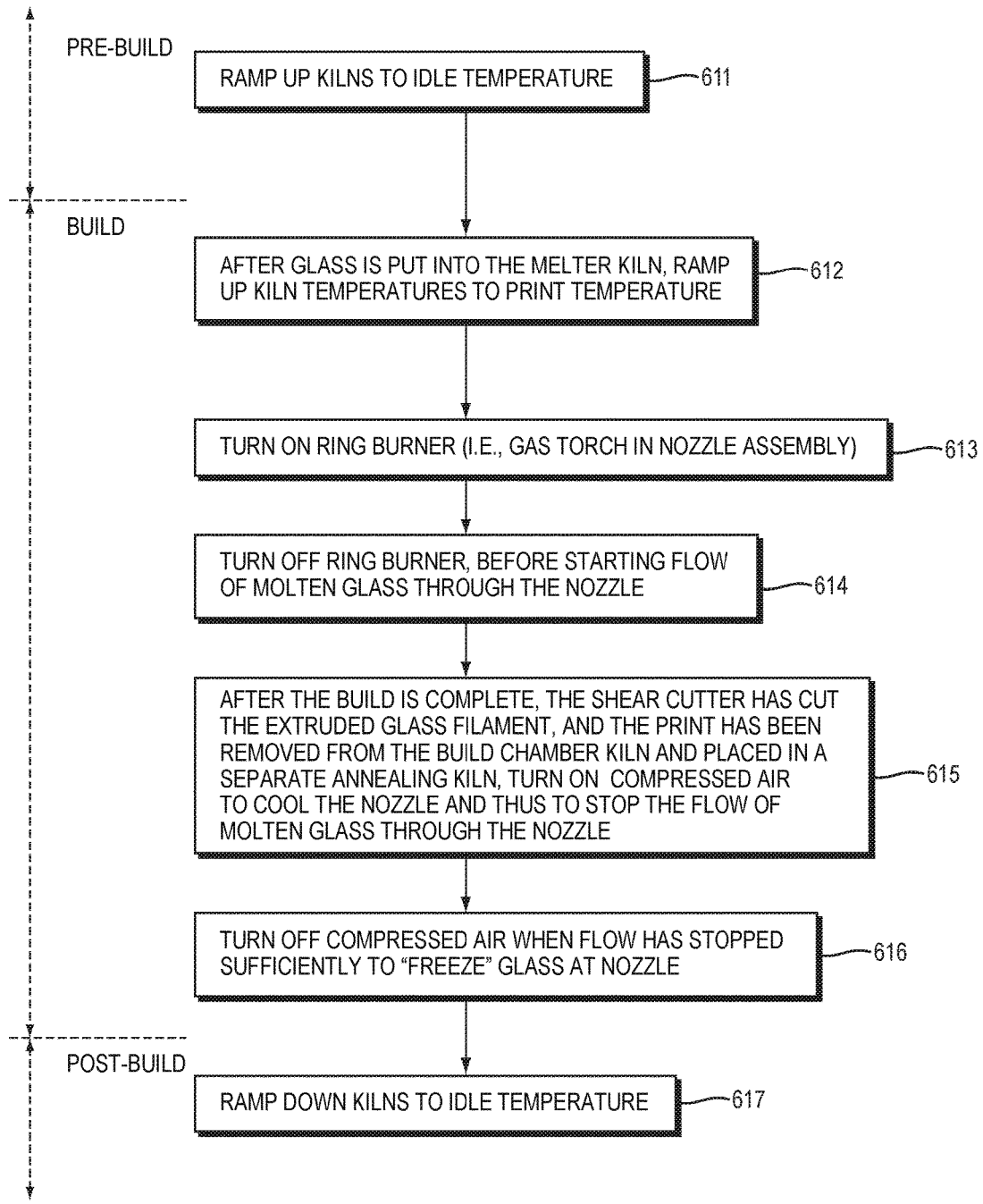
Figure 6C:
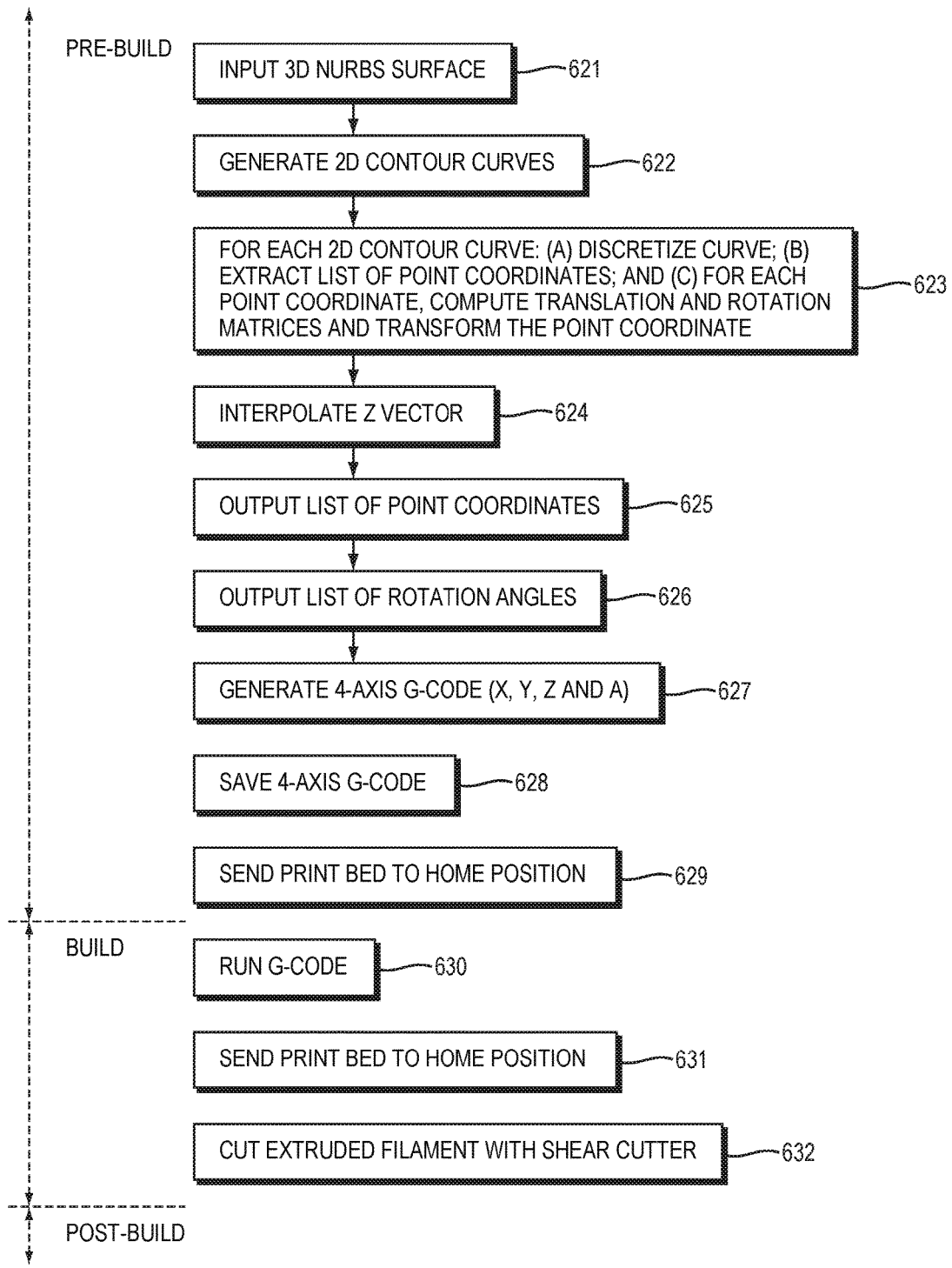

FIGS. 6A, 6B and 6C, taken together, are a flowchart for an overall process of glass 3D printing, in an illustrative implementation of this invention. FIG. 6A lists material handling steps that occur in the method. FIG. 6B lists thermal control steps that occur in the method. FIG. 6C lists motion control steps that occur in the method.

In FIG. 6A, the material handling steps include: Input glass to melter kiln (Step 601). Extrude viscous, molten glass (Step 602). Optionally, send deposited glass to separate annealer (Step 603). Anneal extruded glass (e.g., 2 hours constant at 950° F., then reduce in gradients, 3 hours to 750° F. (−66° F. per hour), then 5 hours to 300° F. (−90° F. per hour), then 4 hours to 100° F. (−50° F. per hour)) (Step 604). Remove hardened glass object from the annealer (Step 605). Grind off bottom layer and top layer of the glass object (Step 606). Polish the bottom and top surfaces of the glass object (Step 607).

In FIG. 6A, step 603 (sending glass to separate annealer) is optional. An advantage of sending the molten glass to a separate annealing chamber is that a new build may begin in the build chamber, without waiting for annealing to be completed. In some cases, the temperature of the build chamber is ramped up (e.g., from 900° F. to 950° F.) before moving the molten glass object to a separate annealing chamber, in order to compensate for the thermal loss during the transport from the build chamber kiln to the separate annealer. Alternatively, the glass may be annealed in the build chamber kiln.

In some implementations, solid glass is fed into the melter kiln, and melted there. Alternatively, glass may be melted in an external kiln and then fed, in a molten state, into the melter kiln.

In FIG. 6B, the thermal control steps include: Ramp up kilns to idle temperature (e.g., 1750° F. for melter kiln, 1550° F. for nozzle kiln, and 750° F. for build chamber kiln), before solid glass is put into the melter kiln (Step 611). After glass is put into the melter kiln, ramp up kiln temperatures to print temperature (e.g., 1850° F. for melter kiln, 1650° F. for nozzle kiln, and 900° F. for build chamber kiln) (Step 612). Turn on ring burner (i.e., gas torch in nozzle assembly) (Step 613). Turn off ring burner, before starting flow of molten glass through the nozzle (Step 614). After the build is complete, the shear cutter has cut the extruded glass filament, and the print has been removed from the build chamber kiln and placed in a separate annealing kiln, turn on compressed air to cool the nozzle and thus to stop the flow of molten glass through the nozzle (Step 615). Turn off compressed air, when flow of glass has stopped sufficiently to "freeze" glass at the nozzle (Step 616). Ramp down kilns to idle temperature (Step 617).

In FIG. 6C, the motion control steps include: Input 3D Nurbs surface (Step 621). Generate 2D contour curves (Step 622). For each 2D contour curve: (a) discretize curve; (b) extract list of point coordinates; and (c) for each point coordinate, compute translation and rotation matrices and transform the point coordinate (Step 623). Interpolate Z vector (Step 624). Output list of point coordinates (Step 625). Output list of rotation angles (Step 626). Generate 4-axis G-code (X, Y, Z and A) (Step 627). Save 4-axis G-code (Step 628). Send print bed to home position (Step 629). Run G-code (Step 630). Send print bed to home position (Step 631). Cut extruded filament with shear cutter (Step 632)

In FIG. 6A, step 601 occurs in a pre-build stage, steps 602 and 603 occur in a build stage, and steps 604—607 occur in a post-build stage. In FIG. 6B, step 611 occurs in a pre-build stage, steps 612-616 occur in a build stage, and step 617 occurs in a post-build stage. In FIG. 6C, steps 621-629 occur in a pre-build stage, and steps 630-632 occur in a build stage.

Figure 7:
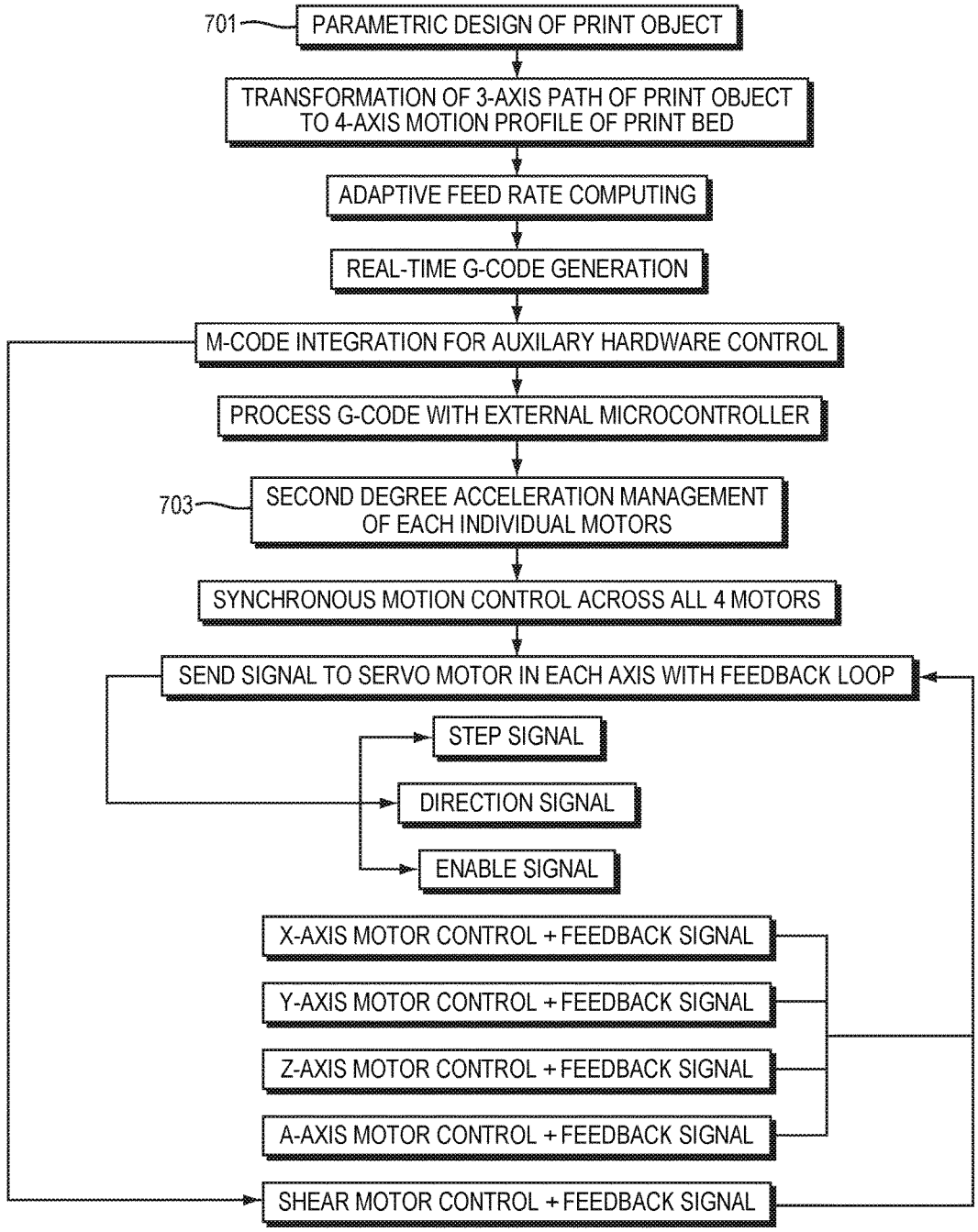
FIG. 7 is a flowchart of a method of motion control.

FIG. 7 is a flowchart of a method of motion control, in an illustrative implementation of this invention. In the example shown in FIG. 7, the steps include, among other things, the parametric design of the print object (Step 701) and acceleration management (Step 703). In the second step in FIG. 7 (transformation of 3-axis path of print object to 4-axis motion profile of print bed), one or more computers perform calculations that ensure that the direction of deposit is constant relative to the nozzle, despite the rotation of the print bed.

This invention is not limited to the motion control shown in FIG. 7. In illustrative embodiments of this invention, motion control may be performed in many other ways.

Figure 8:
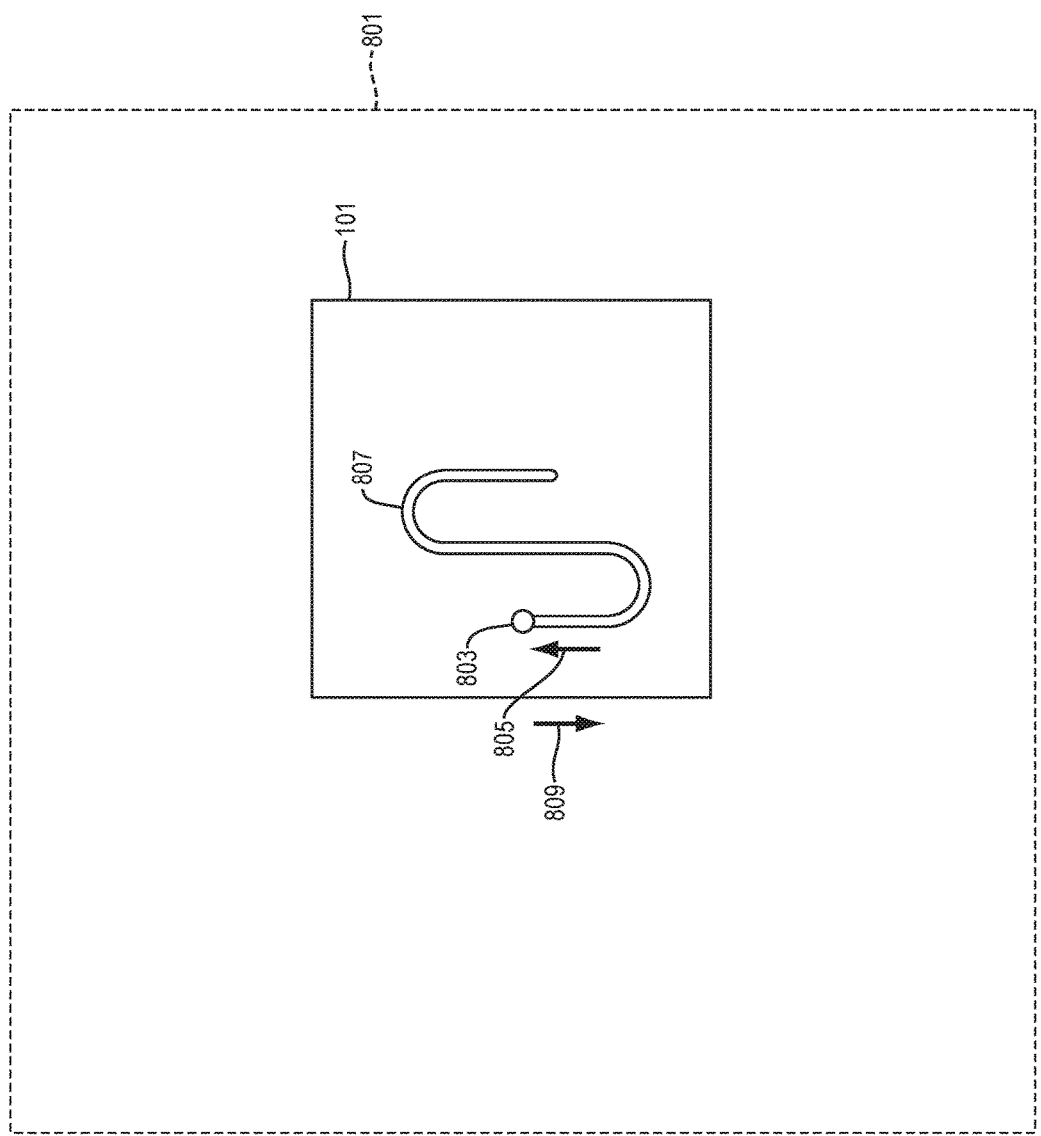

FIGS. 8 and 9 show an example of rotating a print bed to keep the direction of deposition constant relative to the nozzle. FIG. 8 shows the print bed's position at an earlier time than FIG. 9 does.

FIGS. 8 and 9 show a nozzle 803 and a top view of a print bed 101. The nozzle 803 is located above print bed 101

In FIGS. 8 and 9, a box indicates the horizontal boundaries of a 3D volume 801 that is stationary relative to the build chamber walls and relative to a fixed position external to the glass 3D printer. Print bed 101 translates and rotates about a vertical axis that intersects the print bed 101. The translation and rotation of print bed 101 causes the print bed 101 to change position and angular orientation relative to stationary volume 801. The position and angular orientation of print bed 101, relative to stationary volume 801, changes from FIG. 8 to FIG. 9 because print bed 101 translates and rotates during the time interval between those two Figures. The angular orientation of the print bed 101 (relative to fixed volume 801) changes by more than ninety degrees during this time interval, as the print bed 101 rotates clockwise (as seen from the perspective of FIGS. 8 and 9) by more than ninety degrees during this time interval.

In FIGS. 8 and 9, the nozzle 803 is stationary relative to stationary volume 801 and relative to a fixed position external to the glass 3D printer.

In FIGS. 8 and 9, a viscoelastic filament 807 of molten glass is extruded (e.g., by gravity feed) from stationary nozzle 803 and is deposited on the print bed 101. As the print bed moves and the filament is extruded, the filament increases in length. The impact point (i.e., the point at which the extruded filament descending from the nozzle first impacts the print bed or deposited material supported by the print bed) changes position as the print bed moves relative to the nozzle. This impact point moves in a trajectory relative to the print bed (deposition trajectory).

In FIGS. 8 and 9, the direction of deposition at a given time is the horizontal direction in which the impact point is moving relative to the print bed at the given time. Put differently, the direction of deposition is the horizontal tangent (taken at the impact point) to the deposition trajectory.

In the example shown in FIGS. 8 and 9, actuators translate and rotate the print bed, such that the direction of deposition has a constant orientation relative to the stationary nozzle 803. The direction of deposition remains constant (or substantially constant) relative to nozzle 803 throughout the time interval that elapses between FIGS. 8 and 9, even though print bed 101 translates and rotates during that time period. Arrow 805 is parallel to the instantaneous direction of deposition at the instant of time for FIGS. 8 and 9, respectively. Arrow 809 is parallel to the instantaneous direction of movement of the print bed 101.

In illustrative implementations, the following are all stationary relative to each other during the deposition of molten glass: (i) the nozzle, (ii) the crucible kiln, (iii) the support structure for the crucible kiln, and (v) a fixed position external to the glass 3D printer. Thus, in illustrative implementations, the print bed is rotating such that the deposition direction is constant relative to the nozzle, the crucible kiln, the support structure for the kilns, and a fixed position external to the 3D glass printer, respectively.

An advantage of keeping the deposition constant relative to the nozzle is that doing so tends to avoid the large, changing forces that would otherwise arise if the direction of deposition (relative to the stationary nozzle) changed.

To understand the advantages of keeping the direction of deposition at the same angle (relative to the nozzle), it is helpful to see what happens if this is not done.

FIGS. 10A, 10B, 11A, 11B, 12A, 12B show examples of what happens if (a) the direction of deposition varies relative to the nozzle, and (b) the nozzle is asymmetrical. This is significant, because in practice nozzles that print molten glass tend to become asymmetrical due to asymmetrical buildup of hardened glass on the nozzle.

Figure 10A:
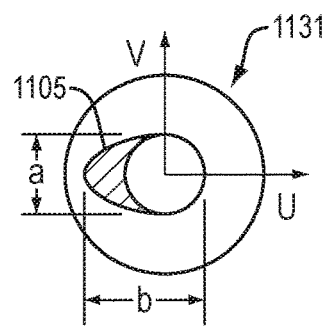
FIGS. 10A and 10B illustrate the effect of varying the direction of deposition relative to an asymmetrical "smeared" nozzle.
Figure 11A:
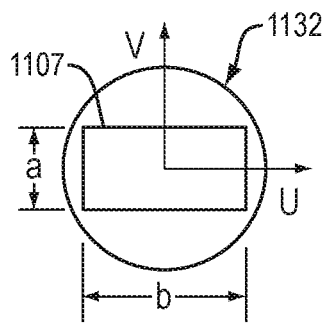
FIGS. 11A and 11B illustrate the effect of varying the direction of deposition relative to an asymmetrical rectangular nozzle.
Figure 12A:
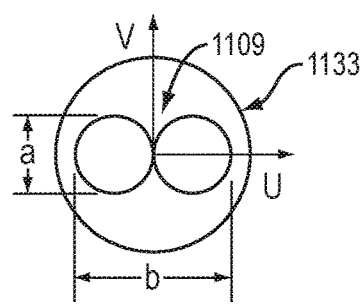
FIGS. 12A and 12B illustrate the effect of varying the direction of deposition relative to an asymmetrical double-orifice nozzle.

FIGS. 10A, 11A and 12A show three non-limiting examples of asymmetrical nozzles. Specifically, FIGS. 10A, 11A and 12A show bottom views of: (a) a so-called "smeared" nozzle that is asymmetrical due to hardened glass built up on it; (b) a rectangular nozzle; and (c) a double-orifice nozzle, respectively.

Figure 10B:
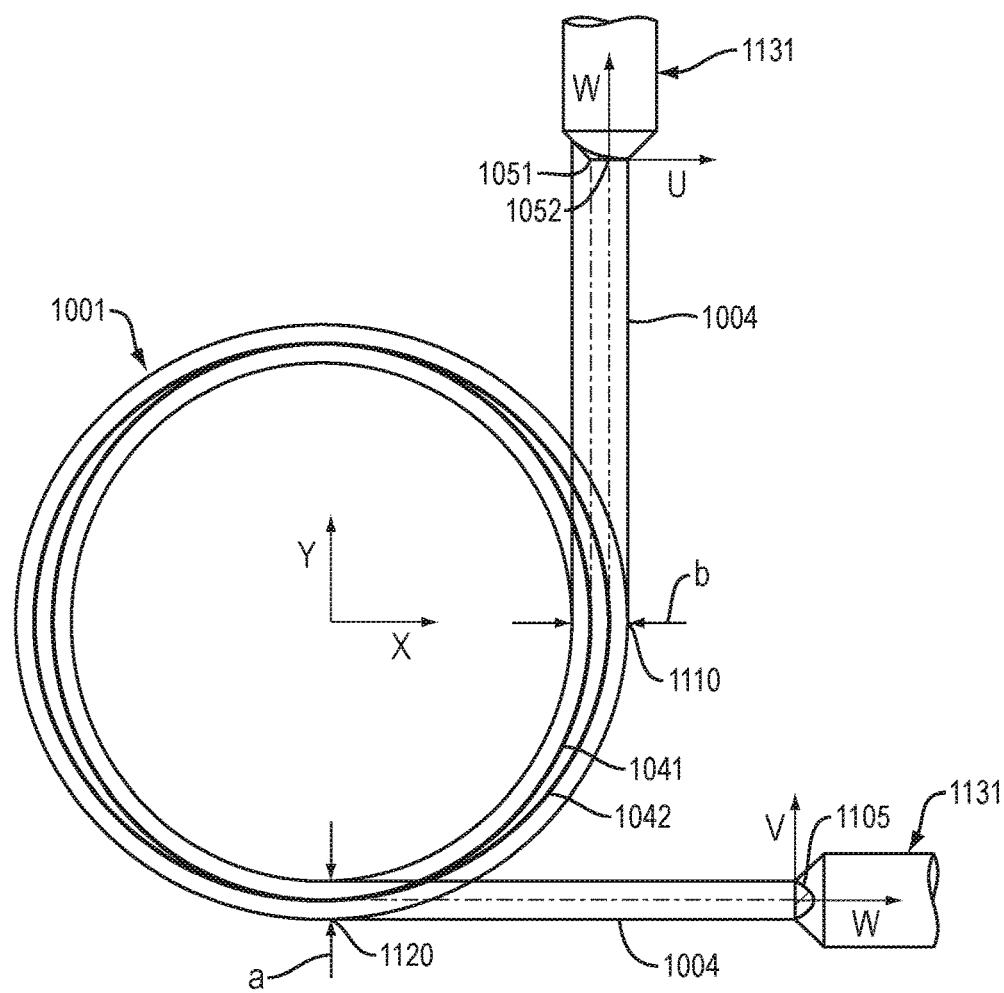
Figure 11B:
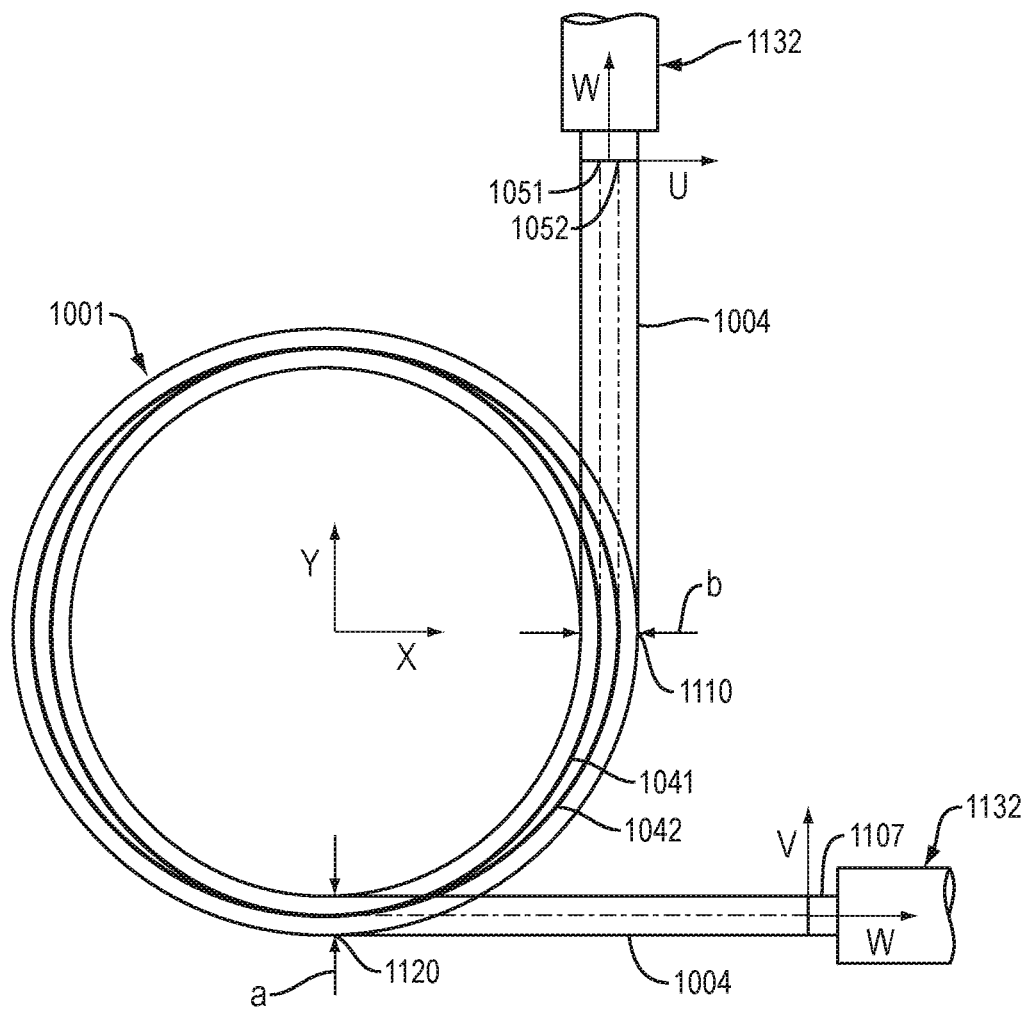

As shown in FIGS. 10B, 11B and 12C: If the direction of deposition changes relative to the nozzle, then asymmetrical nozzles may cause the width of deposited filament to vary at different points in the deposition path. Furthermore, if the direction of deposition changes relative to the nozzle, then a given region of the filament that corresponds to a given region of the nozzle may cross back and forth over the centerline of the deposited filament. Tension lines in the extruded viscoelastic filament extend from the nozzle for a distance along the deposited filament. As the direction of deposition changes relative to the nozzle—and thus the width of the filament changes (and, in some cases, regions of the filament cross back and forth over the centerline of the filament), the filament is subjected to large, changing, tensile and shear forces that tend to damage the filament. In some cases, the forces are so great that they cause deposited layers of the viscoelastic filament to lift and separate from each other, causing catastrophic print failure.

To solve these problems, in illustrative implementations of this invention, the print bed rotates while it translates. The rotation keeps the direction of deposition constant relative to the stationary nozzle.

Figure 13A:
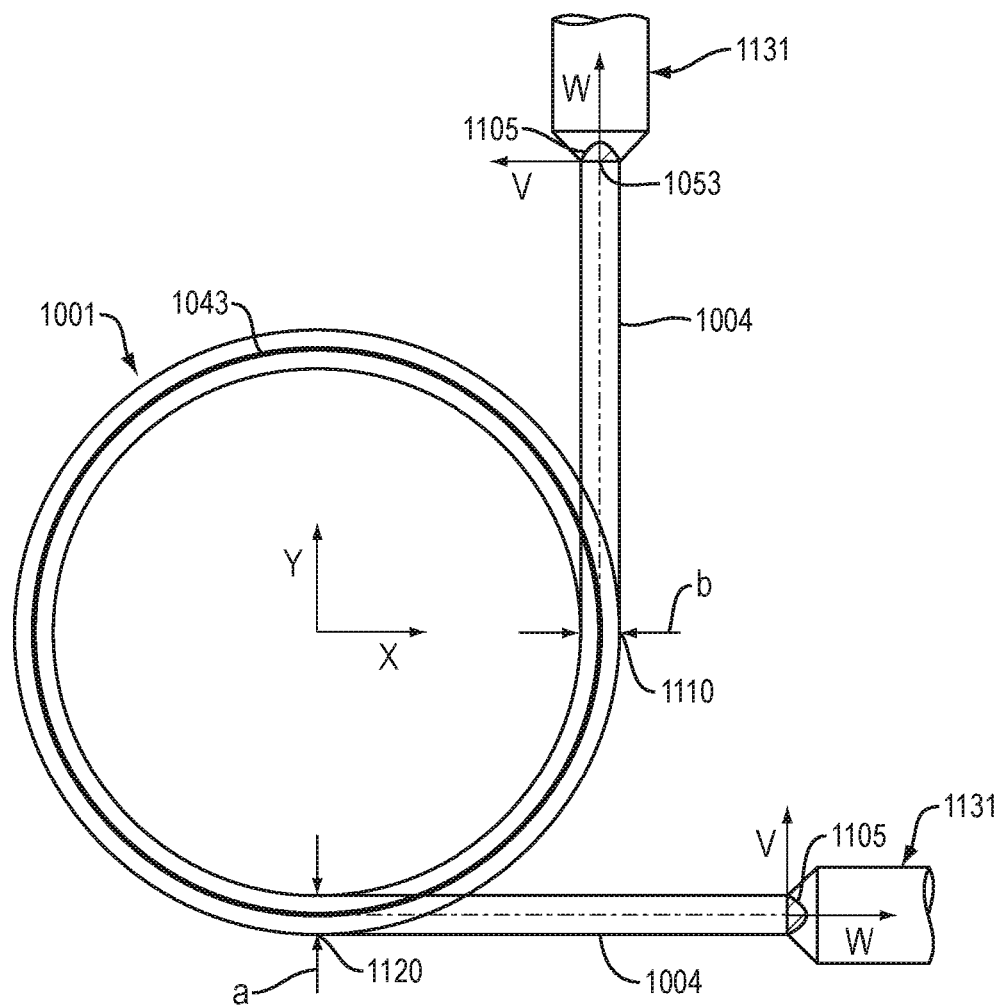
FIGS. 13A, 13B, and 13C show examples of keeping the direction of deposition at a constant angle relative to a stationary nozzle.
Figure 13B:
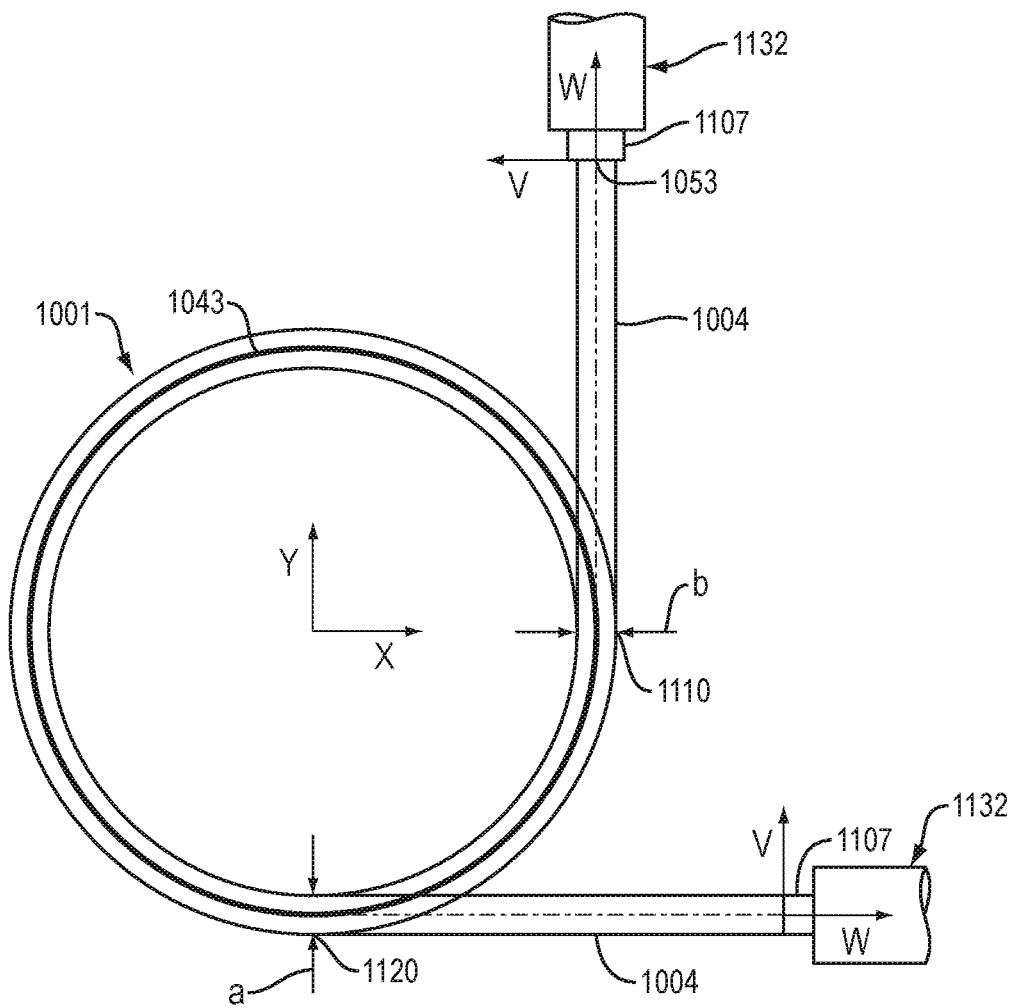
Figure 13C:
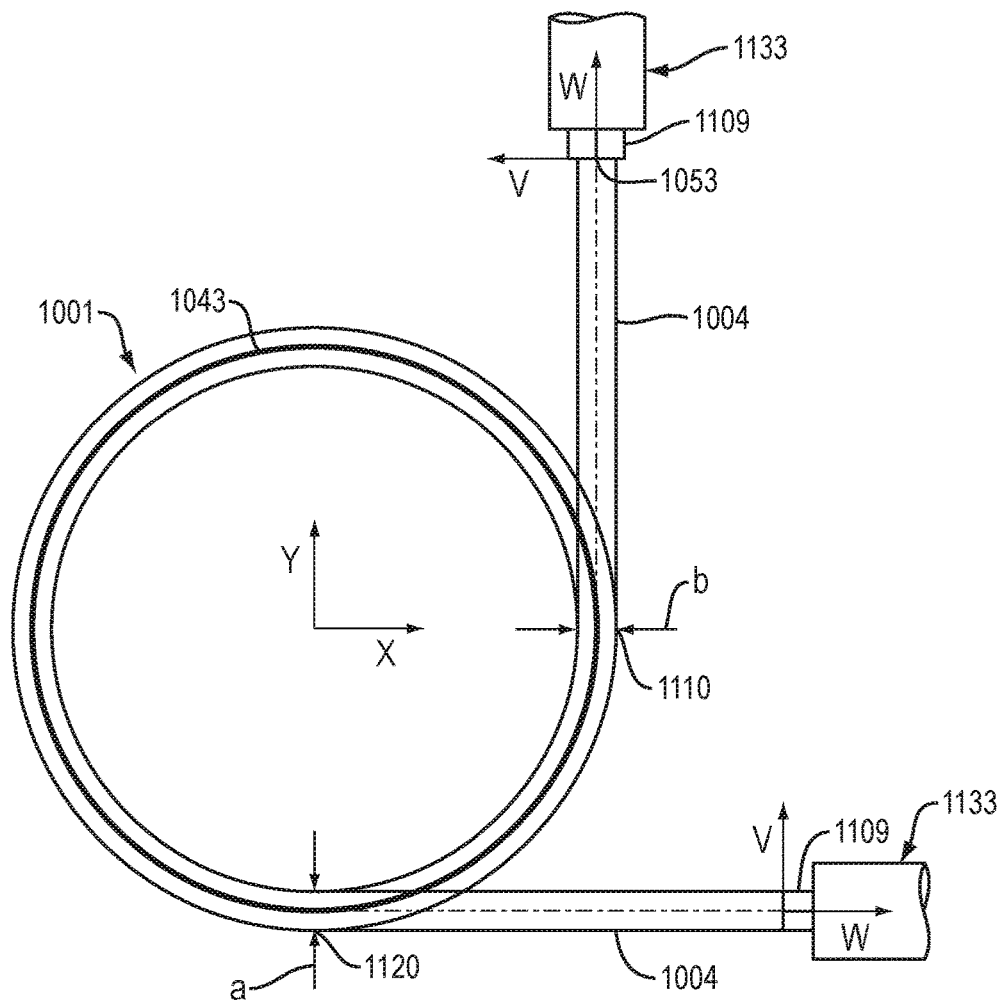

FIGS. 13A, 13B, and 13C show examples of keeping the direction of deposition at a constant angle relative to a stationary nozzle, in illustrative implementations of this invention. In FIGS. 13A, 13B, 13C, the nozzle is asymmetrical. Specifically, in FIGS. 13A, 13B, 13C, the nozzle has a "smeared" asymmetrical shape, a rectangular shape and double-orifice shape, respectively.

FIGS. 13A, 13B, 13C show that a viscoelastic filament deposited in a circular path may have a constant width—if the print bed is rotated to keep the direction of deposition constant relative to the stationary nozzle. They also show that a given region of the filament that corresponds to a given region of an orifice of the nozzle may remain in a constant (cross-sectional) position in the extruded filament—if the print bed is rotated to keep the direction of deposition constant relative to the stationary nozzle.

Thus, by rotating the print bed to keep the direction of deposition constant relative to the stationary nozzle, the changing tensile and shear forces described above may be greatly reduced.

To explain FIGS. 10A to 13C in more detail:

In these Figures (FIGS. 10A to 13C), U, V and W are orthogonal Cartesian axes in the nozzle's frame of reference. U and V are horizontal axes and W is a vertical axis. X and Y axes are horizontal orthogonal Cartesian axes in the print bed's frame of reference.

FIGS. 10B, 11B, 12B, 13A, 13B and 13C each show the nozzle (1131, 1132 or 1133) and descending portion 1004 of the filament at two different times. At the first time, the descending extruded filament is striking the print bed at position 1110. At the second, later time, the descending filament is striking the print bed at position 1120.

For clarity of illustration, FIGS. 10B, 11B, 12B, 13A, 13B and 13C each show the nozzle at two different times at two different points in the path. Thus, the nozzle appears to move from point to point in those Figures. However, in illustrative implementations, the nozzle is actually stationary (relative to a fixed position in the glass 3D printer's environment) and the print bed actually moves relative to the nozzle.

Figure 12B:
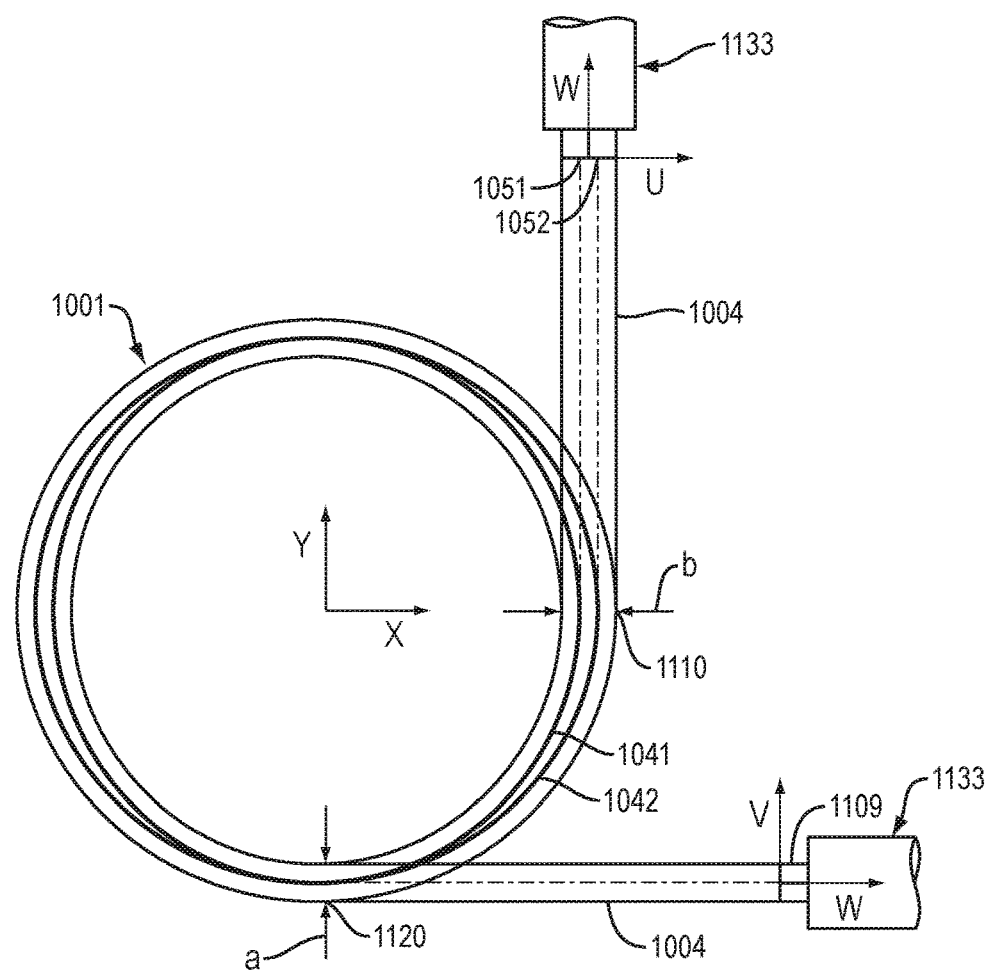

FIGS. 10A, 11A, and 12A show a bottom view of the nozzle shown in FIGS. 10B, 11B, and 12B, respectively. Likewise, the nozzles 1131, 1132 and 1133 in FIGS. 13A, 13B, 13C are the same as those in FIGS. 10A, 11A, and 12A, respectively.

FIGS. 10B, 11B, 12B, 13A, 13B and 13C show a top view of a viscoelastic filament 1001 of molten glass that has been deposited in a circular pattern on a print bed by nozzle 1131, 1332 or 1133.

In FIGS. 10B, 11B, 12B, 13A, 13B and 13C, for ease of illustration: (a) in some cases, axis W appears to be laid on its side; and (b) in some cases, the portion 1004 of the filament that descends from the nozzle to the print bed appears to be laid horizontally on its side. Actually, however, both axis W and portion 1004 of the filament are vertically oriented (e.g., axis W is actually perpendicular to the plane of FIGS. 10B, 11B, 12B, 13A, 13B and 13C).

In FIGS. 10A and 13A, a smear 1005 of hardened glass has built up on nozzle 1131, causing the shape of the nozzle to be asymmetrical or "smeared". In FIGS. 11A and 13B, nozzle 1132 has an asymmetrical, rectangular orifice 1107. In FIGS. 12A and 13C, nozzle 1133 has an asymmetrical, double orifice 1109.

In FIGS. 10B, 11B, 12B, the direction of deposit varies, and thus the width of the deposited filament varies. For example, in FIGS. 10B, 11B, 12B, the width of the filament at position 1110 is b; and the width of the filament at position 1120 is a, where b is greater than a.

In FIGS. 13A, 13B, 13C, the direction of deposit is constant relative to the nozzle, and thus the width of the deposited filament is constant relative to the nozzle. For example, in FIGS. 13A, 13B, 13C, the width of the filament at position 1110 is b; and the width of the filament at position 1120 is a, where b is equal to a.

In FIGS. 10B, 11B, 12B, line 1041 is the trajectory of a region in the extruded filament that was extruded through point 1051 in an orifice of the nozzle. Similarly, line 1042 is the trajectory of a region in the extruded filament that was extruded through point 1052 in an orifice of the nozzle. In FIGS. 13A, 13B and 13C, line 1043 is the trajectory of a region in the extruded filament that was extruded through point 1053 in an orifice of the nozzle.

In FIGS. 10B, 11B, 12B, the direction of deposit varies, and thus the position of trajectories 1041, 1042 varies at different points in the circular path. Indeed, trajectories 1041, 1042 cross over each other twice.

In FIGS. 13A, 13B, 13C, the direction of deposit is constant relative to the nozzle, and thus the position of trajectory 1043 is constant at different points in the circular path.

Software

In illustrative implementations, a computer performs an algorithm to transform coordinates of points in a desired 3D glass geometry (to be fabricated) into coordinates of a trajectory of a print bed that moves relative to a stationary nozzle. For example, printing a simple line from left to right involves moving the print bed from right to left. However, the moving print bed also rotates. Thus, the description of a continuously changing direction of any given path across the geometry through the moving print bed is not as simple as inverse transformation of linear motion since it may also involve continuous change of the axis of rotation.

In some implementations, a computer discretizes the continuous curve domain into a set of finite vector coordinates, then solves the off-axis rotation at each point by devising a coordinate transformation matrix that multiplies a translation matrix for repositioning the axis of rotation and a rotation matrix that reorients the print bed along the tangent of the path at each given point. In some implementations, a computer performs a program to preprocess these iterative coordinate transformations. This program takes the scalar value discretization step as its input, allowing the target resolution to be a part of user defined parameter for later process calibration, while allowing any arbitrary geometry to be described in a set of motion system native to the given printer architecture.

In illustrative implementations, thermal control parameters and motion control parameters are integrated through M-codes in G-code via an Ethernet/Modbus interface protocol. The glass 3D printer provides macro commands as a series of M-codes and enables the integration of various thermal control systems within the motion control workflow. For example, in a prototype of this invention, the macro commands are: M06 shear cutter on; M07 shear cutter off; M08 ring burner on; M09 ring burner off; M10 compressed air on; M11 compressed air off; M20 update melter kiln set temperature; M21 update melter kiln ramp rate; M30 update nozzle kiln set temperature; M31 update nozzle kiln ramp rate; M40 update annealing kiln set temperature; and M41 update annealing kiln ramp rate.

In a prototype of this invention: (a) a Watlow® EZ-zone RM Integrated Controller provides input/output via an Ethernet/Modbus protocol; and (b) a microcontroller with an open-source Ethernet/Modbus library communicates with thermal control hardware.

The Computer Program Listing lists fourteen computer program files, which comprise software used in a prototype of this invention. Here is a description of the software encoded by those fourteen files.

Generally speaking, the first eight computer program files listed below are C# programs that utilize Rhinoceros® 5.0 software (a Non-Uniform Rational B-Spline based CAD software) and Grasshopper® 1.0 software (a graphical programming interface that is tightly coupled with the geometrical and graphical libraries of Rhinoceros®). These first eight programs, taken together, create, modify, evaluate, and extract parameters for real-time mapping of 3-axis virtual coordinates of the print geometry to machine coordinates to control the four-axis CNC (computer numerical control) platform. These first eight programs create parametric geometries, transform and map geometries to movements of the print bed, generate four-axis (x, y, z and rotational) G-code, and control an adaptive feed rate that synchronizes the rotation of the print bed with the movement of the print bed in three Cartesian directions (x, y, z). These first eight programs compute machine coordinates for 4-axis CNC deposition of molten glass at each incremental step-position coordinates for XYZ-Axis, rotational angle for A-Axis, and feed rate at each step.

These first eight computer program files are the first eight files listed in the Computer Program Listing section above. The file name extensions of these first eight program files, which are C# programs, were changed to .txt in order to submit them electronically to the U.S. Patent and Trademark Office. However, to run these C# programs, their file name extensions .txt would be changed to .cs. In a prototype of this invention, each of the C# program is embedded within an individual C# component provided by the Grasshopper® 1.0 software and utilized in conjunction with Rhinoceros® 5.0 software.

(1) G3P_V2_Rhino_GH_SurfaceSlicer.txt: This program is a pre-processing workflow that takes a top down approach with slicing of free-form three-dimensional geometry along z axis to generate a set of contouring curves. This program takes input brep (boundary representation) object and layer height, computes the bounding box of the brep to calculate the required layer count, and output a list of contour curves.

(2) G3P_V2_Rhino_GH_Bi-TangentArc.txt: This program takes a bottom up approach. It creates constant radius parametric curves composed of a radial array of arcs and bi-tangent arcs. This enables a direct coupling of a design parameter for the print geometry with a process parameter of the 3D printing of molten glass—the minimum turning radius suitable for a given viscosity of the molten glass at a given temperature.

This program generates parametric closed curve with constant input radius all around with given number of folds by computing radial array of arcs and bi-tangent arcs.

This program may be run recursively with an array of input variables. When a single pair of input radius and number of arcs is provided, it returns a single closed curve of a constant radius with a given number of folds. When an array of radius and/or an array of the number of arcs are provided, it returns an array of closed curves—making it possible to generate a series of closed curves that changes local radius of folds and/or number of folds continuously while ensuring the compliance of the resulting geometries against the process parameter of the 3D printing of molten glass.

(3) G3P_V2_Rhino_GH_Bi-TangentArc_with_RotationalBifurcation.txt: This program allows continuous change in the number of folds in output curves. This program takes as inputs a pair of starting and ending angles of rotation and number of required steps to complete this rotation. This program applies bidirectional rotation of the base arrangement of the radial array of arcs in both clock-wise and counter clock-wise directions, computes the intersections to extract the exterior profiles, and reconnects them with bi-tangent arcs of a given input radius to generate a parametric curve with complex folds with a constant turning radius all around. While the input number of arcs, which equates the resulting number of folds, may take discrete steps in integer variable, this incremental rotation enables a continuous change in the number of folds. This enables continuous change of cross-sectional profile in both radius and number of folds.

This program returns a parametric curve with continuous and uninterrupted change in the input/output radius and number of folds, and enables a construction of a three-dimensional body with a vertical array of the resulting curves while preserving the continuity in curvature both in horizontal plane (with constant radius all across per planer curve) and vertical plane (with continuous change in radius and number of folds) to comply with the process requirement in the layer-by-layer deposition of the molten glass.

This program generates parametric closed curve with constant input radius all around with given number of folds by computing radial array of arcs and bi-tangent arcs. Optional input variable for the rotation angle computes bidirectional rotation of the base profile and their intersections to generate bifurcation of each fold in continuous domain.

This program may be run recursively with an array of input variables. When a single set of input radius, number of arcs, and rotation angle is provided, it returns a single closed curve of a constant radius with a given number of folds with optional bifurcation of each fold based on the rotational angle. When this set of input variables is provided as an array in continuous domain, it returns an array of closed curves that changes in radius and number of folds in continuous domain—making it possible to construct a three-dimensional body with a vertical array of the resulting curves and ensure topological continuity that also meets the constraints of the process parameters (minimum turning radius, maximum draft angle, and accountable rate of change of curvature) for the layer-by-layer deposition of the molten glass.

Motivation for this program: In illustrative implementations, layer-by-layer deposition of molten glass constrains two geometrical variables: (1) the minimum turning radius in horizontal plane per layer and (2) the maximum draft angle in vertical plane across the layers. Turning sharper than the minimum turning radius would result in the deformation of the cross-section of the molten glass filament. Exceeding the maximum drafting angle would result in the lack of adhesion to the sub-layer.

(4) G3P_V2_Rhino_GH_LinearTranslationAlongZ-Axis.txt: This program takes a list of planer curves and evenly distributes them along the Z-axis based on an input layer height. This program may be run in conjunction with the preceding two programs described above (G3P_V2_Rhino_GH_Bi-TangentArc and G3P_V2_Rhino_GH_Bi-TangentArc_with_RotationalBifurcation).

(5) G3P_V2_Rhino_GH_CurveDiscretization.txt: This program takes an input curve and discretizes it into a polyline with a given input number of segments.

(6) G3P_V2_Rhino_GH_4Axis_Transformation.txt: This program takes a set of input polylines that describe print geometry and remaps each point coordinate of a polyline by multiplying a transformation matrix A to each point such that P1=A×P0, where P0 is the original point coordinate of the polyline, and P1 is the remapped coordinate for the print bed. The transformation matrix A is computed based on the matrix multiplication of a translation matrix B and rotational matrix C such that A=BC. During this transformation, a rotational angle for each transformation is stored as a separate variable. This program returns three separate lists of variables—a list of remapped point coordinates, a list of rotational angle per transformation, and a list of rotational velocity per transformation. These three lists are later used in the process of generating four-axis G-code, where each line comprises the XYZ-Axis coordinates of the remapped point that describes the required location of the central axis and height of the print bed, A-axis coordinate that describes the rotational angle of the print bed, and the feed rate value based on the rotational velocity. In order to ensure a constant feed rate of the print bed with respect to the nozzle, feed rate at each line is compensated proportional to the rotational velocity required at each transformation.

This program (G3P_V2_Rhino_GH_4Axis_Transformation) performs calculations that ensure that the direction of deposit is constant relative to the angular orientation of the nozzle, despite the rotation of the print bed.

(7) G3P_V2_Rhino_GH_SpiralInterpolation.txt: This program takes a list of closed planer polylines and target layer height between each polyline. It remaps each point coordinate of each polyline by linearly interpolating the input layer height along the number of segments in each input polyline and displace its Z-axis coordinate accordingly. By connecting the remapped points all together, the program returns a single continuous polyline in a form of spiral. The resulting spiral describes the print geometry in a single continuous path and ensures a continuous deposition of molten glass along the entire travel length of the print.

(8) G3P_V2_Rhino_GH_4Axis_Geode_Generation.txt: This program takes three lists of variables as its input—a list of point coordinates describing the target position of the print bed in XYZ-Axis, a list of rotational angle describing the target rotational angle of the A-Axis, and a list of rotational velocity required to remap the feed rate of the print bed at each step in order to ensure a constant feed rate of the print bed with respect to the nozzle (at which the molten glass is deposited at a constant flow rate).

The next four computer program files (listed below) are the ninth, ten, eleventh and twelfth files listed in the Computer Program Listing section above. The file name extensions of these four program files, which are Javascript® programs, were changed to .txt in order to submit them electronically to the U.S. Patent and Trademark Office. However, to run these Javascript® programs, their file name extensions .txt would be changed to .js.

(9)-(12) G3P_V2_Chilipeppr_01.txt; (10) G3P_V2_Chilipeppr_02.txt; (11) G3P_V2_Chilipeppr_03.txt; (12) G3P_V2_Chilipeppr_04.txt: These four Chilipeppr programs provide custom web browser interface that enables bi-directional communication between Chilipeppr (web browser interface that displays, sends, and receives status of each motor), TinyG® (microcontroller that receives signal from Chilipeppr and coordinates motion control across all motors, and sends signal to individual motor), and motors (servo motors with embedded encoder that receives signal from TinyG® and sends feedback signal to Chilipeppr).

The next two computer program files (listed below) are the thirteenth and fourteenth files listed in the Computer Program Listing section above. The file name extensions of these two program files, which are C++ programs, were changed to .txt in order to submit them electronically to the U.S. Patent and Trademark Office. However, to run these C++ programs, their names would be changed by replacing_h.txt with .h and by replacing_cpp.txt with .cpp.

(13)-(14) G3P_V2_Firmware_MotorMonitor_h.txt and G3P_V2_Firmware_MotorMonitor_cpp.txt: These two C++ programs (the header file .h and .cpp file) work in tandem. They are uploaded to an external microcontroller (Arduino, in a prototype of this invention) and enable the bi-directional communication between the motion control user interface (Chilipeppr, in a prototype of this invention) and each motor (Servo motors with embedded encoders, servo drives, and controllers, ClearPath®, in a prototype of this invention). While incoming signal to each motor is sent from the motion control user interface (Chilipeppr in a prototype of this invention) via an external motion controller with embedded microcontroller (TinyG®, in a prototype of this invention), outgoing signal from each motor is received by motion control user interface (Chilipeppr) via a separate microcontroller (e.g., Arduino®). This program allows the external microcontroller to communicate with each motor in order to retrieve motor's each status such as position, velocity, acceleration, torque, and error count. This enables the feedback loop between the motion control user interface and each motor, and enables various operations such as homing procedure based on each motor's torque and error count feedback, as well as error handling procedure based on the comparison between commanded (outgoing) position, velocity, and/or acceleration signal and corresponding receiving (incoming) position, velocity, and/or acceleration signal, In a prototype of this invention, data flows from a G-code file in a computer to web browser based motion control user interface with G-code interpreter, to an external multi-axis motion controller with G-code processor, to individual motors. A computer controls a GUI (graphical user interface) based on Chilipeppr software. The Chilipeppr software communicates with TinyG®. The TinyG® is a hardware with embedded microcontroller and enables multi-axis motor control. Chilipeppr communicates with TinyG® via Serial Port JSON Server. The glass 3D printer includes additional microprocessors that receive feedback signals from each servo motor, in each of the four axes, enable homing cycle without needing external sets of NC/NO based end stop sensors, and enable communication with auxiliary components of the printer including the on/off mechanisms for the compressed air, gas burner, and shear cutter.

This invention is not limited to the software described above (including the fourteen computer program files in the Computer Program Listing). Other software may be employed. Depending on the particular implementation, the software used in this invention may vary.

Alternative Implementations

This invention is not limited to the implementations described above. Here are some non-limiting examples of other ways in which this invention may be implemented.

In some implementations of this invention, additional M-codes are employed with a Ethernet/Modbus® interface protocol to automatically control: (a) motorized feeding of input glass nuggets and frits into a melter kiln; (b) selection of different color glass frits (in conjunction with the continuous feeding system described above); (c) active pressure-regulated rate of flow of molten glass through nozzle; (d) motorized end effector with auger and/or plunger to actuate flow of molten glass through nozzle; (e) motorized orifice shape changer attached at the end of the nozzle for dynamically controlling the cross-sectional profile of the glass filament in deposition; and (f) motorized reshaping flap attached at the end of the nozzle for dynamically reshaping the cross-sectional profile of the glass filament after deposition.

In some implementations, the print bed rotates about a vertical axis that intersects a horizontal centroid of the print bed. Alternatively, the print bed may rotate about a vertical axis that intersects a different point in the print bed, or may rotate about a vertical axis that intersects a point that is not located in the print bed.

This invention is not limited to a stationary nozzle. Alternatively, the nozzle may rotate. In those cases, the print bed may translate in x, y, z directions, while the nozzle rotates, in such a manner that the direction of deposition is constant relative to the angular orientation of the nozzle. For example, the entire nozzle may rotate. Alternatively, the nozzle may include two concentric annular parts, with the outer annular part rotating and the inner annular part being stationary. The rotating, outer annular part may comprise the effective nozzle profile. A motor may actuate rotation of the nozzle via one or more gears and drive trains. For example, an outer perimeter of the nozzle may comprise a gear that is actuated to rotate, via one or more other gears, by a motor. The motor may be at a distance from the nozzle, and may be protected by insulation from the heat of the nozzle kiln.

Computers

In illustrative implementations of this invention, one or more electronic computers (e.g., servers, network hosts, client computers, integrated circuits, microcontroller, controllers, field-programmable-gate arrays, personal computers, or other onboard or remote computers) are programmed and specially adapted: (1) to control the operation of, or interface with, hardware components of a a CNC filament deposition system for deposition of molten glass, including heating systems, motors, other actuators, thermometers, and other sensors; (2) to control translation and rotation of a print bed; (3) to perform any other calculation, computation, program, algorithm, or computer function described or implied above; (4) to receive signals indicative of human input; (5) to output signals for controlling transducers for outputting information in human perceivable format; and (6) to process data, to perform computations, to execute any algorithm or software, and to control the read or write of data to and from memory devices (items 1-6 of this sentence referred to herein as the "Computer Tasks"). The one or more computers (e.g. 120, 132, 229) may be in any position or positions within or outside of the glass 3D printer. For example, in some cases (a) at least one computer is housed in or together with other components of the glass 3D printer, such as power supply hardware, and (b) at least one computer is remote from other components of the glass 3D printer. The one or more computers may communicate with each other or with other components of the glass 3D printer either: (a) wirelessly, (b) by wired connection, (c) by fiber-optic link, or (d) by a combination of wired, wireless or fiber optic links.

In exemplary implementations, one or more computers are programmed to perform any and all calculations, computations, programs, algorithms, computer functions and computer tasks described or implied above. For example, in some cases: (a) a machine-accessible medium has instructions encoded thereon that specify steps in a software program; and (b) the computer accesses the instructions encoded on the machine-accessible medium, in order to determine steps to execute in the program. In exemplary implementations, the machine-accessible medium comprises a tangible non-transitory medium. In some cases, the machine-accessible medium comprises (a) a memory unit or (b) an auxiliary memory storage device. For example, in some cases, a control unit in a computer fetches the instructions from memory.

In illustrative implementations, one or more computers execute programs according to instructions encoded in one or more tangible, non-transitory, computer-readable media. For example, in some cases, these instructions comprise instructions for a computer to perform any calculation, computation, program, algorithm, or computer function described or implied above. For example, in some cases, instructions encoded in a tangible, non-transitory, computer-accessible medium comprise instructions for a computer to perform the Computer Tasks.

Network Communication

In illustrative implementations of this invention, an electronic device (e.g., 120, 121-127, 132, 229) is configured for wireless or wired communication with other electronic devices in a network.

For example, in some cases, one or more of the electronic devices (e.g., 120, 121-127, 132, 229) each include a wireless communication module for wireless communication with other electronic devices in a network. Each wireless communication module (e.g., 131) may include (a) one or more antennas, (b) one or more wireless transceivers, transmitters or receivers, and (c) signal processing circuitry. Each wireless communication module may receive and transmit data in accordance with one or more wireless standards.

In some cases, one or more of the following hardware components are used for network communication: a computer bus, a computer port, network connection, network interface device, host adapter, wireless module, wireless card, signal processor, modem, router, computer port, cables or wiring.

In some cases, one or more computers (e.g., 120, 132, 229) are programmed for communication over a network. For example, in some cases, one or more computers are programmed for network communication: (a) in accordance with the Internet Protocol Suite, or (b) in accordance with any other industry standard for communication, including any USB standard, ethernet standard (e.g., IEEE 802.3), token ring standard (e.g., IEEE 802.5), wireless standard (including IEEE 802.11 (wi-fi), IEEE 802.15 (bluetooth/zigbee), IEEE 802.16, IEEE 802.20 and including any mobile phone standard, including GSM (global system for mobile communications), UMTS (universal mobile telecommunication system), CDMA (code division multiple access, including IS-95, IS-2000, and WCDMA), or LTS (long term evolution)), or other IEEE communication standard.

Definitions

The terms "a" and "an", when modifying a noun, do not imply that only one of the noun exists.

To compute "based on" specified data means to perform a computation that takes the specified data as an input.

The term "comprise" (and grammatical variations thereof) shall be construed as if followed by "without limitation". If A comprises B, then A includes B and may include other things.

The term "computer" includes any computational device that performs logical and arithmetic operations. For example, in some cases, a "computer" comprises an electronic computational device, such as an integrated circuit, a microprocessor, a mobile computing device, a laptop computer, a tablet computer, a personal computer, or a mainframe computer. In some cases, a "computer" comprises: (a) a central processing unit, (b) an ALU (arithmetic logic unit), (c) a memory unit, and (d) a control unit that controls actions of other components of the computer so that encoded steps of a program are executed in a sequence. In some cases, a "computer" also includes peripheral units including an auxiliary memory storage device (e.g., a disk drive or flash memory), or includes signal processing circuitry. However, a human is not a "computer", as that term is used herein.

"Defined Term" means a term or phrase that is set forth in quotation marks in this Definitions section.

"Deposition direction" or "direction of deposition", at a given time, means the instantaneous horizontal direction in which the impact point is moving, relative to the print bed, along the deposition trajectory at the given time. The "deposition direction", at a given time, is along a straight line, which straight line is the tangent, at the impact point for the given time, to the deposition trajectory.

"Deposition trajectory" means the trajectory of the impact point relative to the print bed.

For an event to occur "during" a time period, it is not necessary that the event occur throughout the entire time period. For example, an event that occurs during only a portion of a given time period occurs "during" the given time period.

The term "e.g." means for example.

The fact that an "example" or multiple examples of something are given does not imply that they are the only instances of that thing. An example (or a group of examples) is merely a non-exhaustive and non-limiting illustration.

An "exit orifice" of a nozzle means an orifice through which a fluid or other material exits the nozzle.

A non-limiting example of "extrusion" is flow of molten glass through a nozzle, which flow is actuated only by gravitational force.

Unless the context clearly indicates otherwise: (1) a phrase that includes "a first" thing and "a second" thing does not imply an order of the two things (or that there are only two of the things); and (2) such a phrase is simply a way of identifying the two things, respectively, so that they each may be referred to later with specificity (e.g., by referring to "the first" thing and "the second" thing later). For example, unless the context clearly indicates otherwise, if an equation has a first term and a second term, then the equation may (or may not) have more than two terms, and the first term may occur before or after the second term in the equation. A phrase that includes a "third" thing, a "fourth" thing and so on shall be construed in like manner.

"Fixed position" means, in the context of an apparatus that includes a print bed and a nozzle, a stationary position in a frame of reference that is fixed relative to points in the ground beneath the apparatus.

"For instance" means for example.

To say a "given" X is simply a way of identifying the X, such that the X may be referred to later with specificity. To say a "given" X does not create any implication regarding X. For example, to say a "given" X does not create any implication that X is a gift, assumption, or known fact.

"Glass material" means a material that comprises, when solid: (a) silicate glass, (b) lead glass, (c) borate glass, (d) phosphate glass, (e) fluoride glass, or (f) chalcogenide glass. As used herein, "glass material" remains glass material, regardless of temperature (e.g., above or below glass transition temperature) or phase (e.g., solid or liquid).

Non-limiting examples of a "heating element" include a resistive heating element and an inductive heater.

"Herein" means in this document, including text, specification, claims, abstract, and drawings.

"Impact point" means, for a given time: (a) the point in the print bed at which material in a filament extruded from a nozzle is first striking the print bed at the given time, or (b) if, at the given time, the filament is striking material that is supported by the print bed, the point in the print bed that is directly vertically below the point at which the filament is first striking the material at the given time. As a deposited filament lengthens and is deposited at different points on a print bed, the impact point changes position.

As used herein: (1) "implementation" means an implementation of this invention; (2) "embodiment" means an embodiment of this invention; (3) "case" means an implementation of this invention; and (4) "use scenario" means a use scenario of this invention.

The term "include" (and grammatical variations thereof) shall be construed as if followed by "without limitation".

A non-limiting example of "layer-by-layer" deposition is to deposit flat, separate layers, one on top of another. Another non-limiting example of "layer-by-layer" deposition is to deposit a filament in a spiral such that different layers of the spiral are all portions of the same filament. Another non-limiting example of "layer-by-layer" deposition is to deposit a filament such that the filament bends in a non-spiral shape, such that a first portion of the filament rests on a second portion of the filament, and the second portion of the filament rests on a third portion of the filament.

As used herein: (a) to say that a glass material is "molten" means that the temperature of the glass material is above the glass transition temperature of the glass material; and (b) to say that glass is "molten" means that the temperature of the glass is above the glass transition temperature of the glass. As used herein: (a) to say that a glass material "melts" means that the glass material undergoes a glass transition as the temperature of the glass material increases; and (b) to say that glass "melts" means that the glass undergoes a glass transition as the temperature of the glass increases.

As used herein, "nozzle" means any orifice through which material (such as molten glass, gas, liquid, fluid, or solid) passes. A nozzle may have any shape. For example, in some cases, a nozzle may have a shape that does not accelerate material the as the material exits the nozzle.

The term "or" is inclusive, not exclusive. For example, A or B is true if A is true, or B is true, or both A or B are true. Also, for example, a calculation of A or B means a calculation of A, or a calculation of B, or a calculation of A and B.

A parenthesis is simply to make text easier to read, by indicating a grouping of words. A parenthesis does not mean that the parenthetical material is optional or may be ignored.

The "plane" of a patent drawing (which patent drawing is displayed by a page or screen) means the plane in which the page or screen lies.

"Print bed" means, in the context of a nozzle that extrudes material, a solid component onto which the extruded material is deposited.

To say that an object rotates by at least a given number of degrees during a period means that the rotation is such that the angular orientation of the object at a first time during the period differs by at least the given number of degrees from the angular orientation of the object at a second time during the period. To say that an object rotates by at least a given number of degrees during a period: (a) does not create any implication regarding whether rotation is continuous or in discrete steps; and (b) does not create any implication regarding whether rotation involves a monotonic change in angle.

As used herein, the term "set" does not include a group with no elements. Mentioning a first set and a second set does not, in and of itself, create any implication regarding whether or not the first and second sets overlap (that is, intersect).

Non-limiting examples of "silicate glass" include fused quartz glass, soda-lime-silica glass, sodium borosilicate glass (including Pyrex® glass), lead-oxide glass, and aluminosilicate glass.

"Some" means one or more.

To say that a deposition direction is "substantially constant" relative to a nozzle throughout a period means that the angular orientation of the deposition direction, relative to the nozzle, does not change by more than five percent throughout the period.

To say that an object "substantially rotates" during a period means that the object rotates by at least fifteen degrees during the period.

The term "such as" means for example.

To say that a machine-readable medium is "transitory" means that the medium is a transitory signal, such as an electromagnetic wave.

"Translation" means movement that is the sum of one or movements along one or more orthogonal spatial axes.

Except to the extent that the context clearly requires otherwise, if steps in a method are described herein, then the method includes variations in which: (1) steps in the method occur in any order or sequence, including any order or sequence different than that described; (2) any step or steps in the method occurs more than once; (3) any two steps occur the same number of times or a different number of times during the method; (4) any combination of steps in the method is done in parallel or serially; (5) any step in the method is performed iteratively; (6) a given step in the method is applied to the same thing each time that the given step occurs or is applied to different things each time that the given step occurs; or (7) the method includes other steps, in addition to the steps described.

This Definitions section shall, in all cases, control over and override any other definition of the Defined Terms. The Applicant or Applicants are acting as his, her, its or their own lexicographer with respect to the Defined Terms. For example, the definitions of Defined Terms set forth in this Definitions section override common usage or any external dictionary. If a given term is explicitly or implicitly defined in this document, then that definition shall be controlling, and shall override any definition of the given term arising from any source (e.g., a dictionary or common usage) that is external to this document. If this document provides clarification regarding the meaning of a particular term, then that clarification shall, to the extent applicable, override any definition of the given term arising from any source (e.g., a dictionary or common usage) that is external to this document. To the extent that any term or phrase is defined or clarified herein, such definition or clarification applies to any grammatical variation of such term or phrase, taking into account the difference in grammatical form. For example, the grammatical variations include noun, verb, participle, adjective, and possessive forms, and different declensions, and different tenses.

Variations

This invention may be implemented in many different ways. Here are some non-limiting examples:

In some implementations, this invention is a method comprising a nozzle extruding material onto a print bed during a period of time, such that: (a) the material is deposited in a deposition direction; (b) the nozzle is stationary relative to a fixed position throughout the entire period; (c) one or more motors actuate the print bed such that, during the period (i) the print bed undergoes translation relative to the fixed position and to the nozzle, and (ii) the print bed undergoes rotation about a point in the print bed; and (d) the deposition direction is substantially constant, relative to the nozzle and to the fixed position, throughout the entire period, even though the rotation involves the print bed substantially rotating about the point during the period. In some cases, the extruding is a part of a fabrication process for fabricating a 3D object that comprises the glass material. In some cases, the method further comprises a gas torch heating the nozzle after the material is extruded through the nozzle. In some cases, the method further comprises computer-controlled shears cutting a filament of glass material extruded from the nozzle. In some cases, the method further comprises compressed air cooling the nozzle, after the shears cut the filament. In some cases, the method further comprises one or more computers transforming coordinates of points in a virtual model of the 3D object into points in a trajectory of the print bed. Each of the cases described above in this paragraph is an example of the method described in the first sentence of this paragraph, and is also an example of an embodiment of this invention that may be combined with other embodiments of this invention.

In some implementations, this invention is a system comprising: (a) a print bed; (b) a first kiln for heating material; (c) a nozzle for extruding the material onto the print bed during a period of time, which nozzle is stationary relative to a fixed position throughout the entire period; and (d) one or more motors for actuating the print bed such that, during the period (i) the print bed undergoes translation relative to the fixed position and to the nozzle, (ii) the print bed undergoes rotation about a point in the print bed, (iii) the material is deposited in a deposition direction, and (iv) the deposition direction is substantially constant, relative to the nozzle and to the fixed position, throughout the entire period, even though the rotation involves the print bed substantially rotating about the point during the period. In some cases, the extruding is a part of a fabrication process for fabricating a 3D object that comprises the glass material. In some cases, the system further comprises a gas torch for heating the nozzle before the material is extruded through the nozzle. In some cases, the system further comprises computer-controlled shears for cutting a filament of glass material extruded from the nozzle. In some cases, the system further comprises tubing for delivering compressed air to cool the nozzle. In some cases, the system further comprises one or more computers that are programmed to transform coordinates of points in a virtual model of the 3D object into points in a trajectory of the print bed. Each of the cases described above in this paragraph is an example of the system described in the first sentence of this paragraph, and is also an example of an embodiment of this invention that may be combined with other embodiments of this invention.

In some implementations, this invention is a method comprising a nozzle extruding material onto a print bed during a period of time, such that: (a) the material is deposited in a deposition direction; (b) during the period, one or more motors actuate the print bed such that the print bed undergoes translation relative to a fixed position and to the nozzle; and (c) during the period, a motor actuates rotation of at least a portion of the nozzle about a given point in the orifice of the nozzle, such that the deposition direction is substantially constant relative to a reference line throughout the entire period, even though the rotation involves the nozzle substantially rotating about the given point during the period; wherein the reference line is a straight line that intersects the given point and a point in a wall of the nozzle. In some cases, the extruding is a part of a fabrication process for fabricating a 3D object that comprises the glass material. In some cases, the method further comprises a gas torch heating the nozzle after the material is extruded through the nozzle. In some cases, the method further comprises computer-controlled shears cutting a filament of glass material extruded from the nozzle. In some cases, the method further comprises compressed air cooling the nozzle, after the shears cut the filament. In some cases, the method further comprises one or more computers transforming coordinates of points in a virtual model of the 3D object into points in a trajectory of the print bed. Each of the cases described above in this paragraph is an example of the method described in the first sentence of this paragraph, and is also an example of an embodiment of this invention that may be combined with other embodiments of this invention.

In some implementations, this invention is a system comprising: (a) a print bed; (b) a first kiln for heating material; (c) a nozzle for extruding the material onto the print bed during a period of time, such that the material is deposited in a deposition direction; (d) one or more motors for actuating the print bed such that, during the period, the print bed undergoes translation relative to a fixed position and to the nozzle; and (e) another motor for actuating rotation of at least a portion of the nozzle about a given point in the orifice of the nozzle, such that the deposition direction is substantially constant relative to a reference line throughout the entire period, even though the rotation involves the nozzle substantially rotating about the given point during the period; wherein the reference line is a straight line that intersects the given point and a point in a wall of the nozzle. In some cases, the extruding is a part of a fabrication process for fabricating a 3D object that comprises the glass material. In some cases, the system further comprises a gas torch for heating the nozzle before the material is extruded through the nozzle. In some cases, the system further comprises computer-controlled shears for cutting a filament of glass material extruded from the nozzle. In some cases, the system further comprises tubing for delivering compressed air to cool the nozzle. In some cases, the system further comprises one or more computers that are programmed to transform coordinates of points in a virtual model of the 3D object into points in a trajectory of the print bed. Each of the cases described above in this paragraph is an example of the system described in the first sentence of this paragraph, and is also an example of an embodiment of this invention that may be combined with other embodiments of this invention.

The above description (including without limitation any attached drawings and figures) describes illustrative implementations of the invention. However, the invention may be implemented in other ways. The methods and apparatus which are described above are merely illustrative applications of the principles of the invention. Other arrangements, methods, modifications, and substitutions by one of ordinary skill in the art are therefore also within the scope of the present invention. Numerous modifications may be made by those skilled in the art without departing from the scope of the invention. Also, this invention includes without limitation each combination and permutation of one or more of the above-mentioned implementations, embodiments and features.

What is claimed is:

1. A method comprising extruding material from a nozzle onto a print bed, wherein:
   (a) during the extruding, the material is deposited in a deposition direction;
   (b) one or more motors actuate the print bed in such a way that
      (i) during the extruding, the print bed undergoes a translation relative to the nozzle, which translation has an x-component and a y-component, the x-component being movement in a direction parallel to an x-axis, the y-component being movement in a direction parallel to a y-axis, and the x- and y-axes being perpendicular to each other, and
      (ii) during the translation, the print bed substantially rotates about an axis that is parallel to a z-axis, the z-axis being perpendicular to the x-axis and to the y-axis;
   (c) the deposition direction is substantially constant relative to the nozzle throughout the entire translation;
   (d) the nozzle is stationary relative to a fixed position throughout the entire translation; and
   (e) the method further comprises heating, with a gas torch, the nozzle in such a way that the heating melts material that has built up on an exterior surface of the nozzle.

2. The method of claim 1, wherein:
   (a) the material is deposited at impact points in a deposition trajectory; and
   (b) the deposition trajectory has multiple inflection points.

3. The method of claim 1, wherein:
   (a) the speed of the nozzle relative to the print bed is constant throughout the entire translation; and
   (b) the angular velocity of the print bed varies during the translation.

4. The method of claim 1, wherein:
   (a) during the translation, the material is deposited at impact points in a deposition trajectory; and
   (b) the deposition trajectory has an overall shape that is neither a circle, nor a spiral, nor an involute of a circle, nor a segment of a straight line, nor a portion of a circle, nor a portion of a spiral, nor a portion of an involute of a circle.

5. The method of claim 1, wherein:
   (a) the extruding fabricates a 3D object; and
   (b) the method further comprises one or more computers transforming coordinates of points in a virtual model of the 3D object into points in a trajectory of the print bed.

6. The method of claim 1, wherein:
   (a) the translation of the print bed has an instantaneous direction, relative to the nozzle, at any given instant during the translation; and
   (b) the instantaneous direction is not constant throughout the entire translation.

7. The method of claim 1, wherein:
   (a) the material that is deposited during the translation comprises a filament; and (b) after the filament is deposited, the filament has a constant width, such that the width is identical at different spatial points along the filament.

8. The method of claim 1, wherein:
(a) the material that is deposited during the translation comprises a filament; and
(b) after the filament is deposited, a cross-sectional region of the filament
  (i) corresponds to a particular region of an orifice of the nozzle, and
  (ii) is in a constant cross-sectional position of the filament, in different cross-sections of the filament.

9. The method of claim 2, wherein the speed of the nozzle relative to the print bed is constant throughout the entire translation.

10. A system comprising:
(a) a print bed;
(b) a first kiln that is configured to heat material;
(c) a nozzle that is configured to extrude the material onto the print bed during a period of time, which nozzle is stationary relative to a fixed position throughout the entire period; and
(d) one or more motors that are configured to actuate the print bed in such a way that
  (i) while the material is being extruded, the print bed undergoes a translation relative to the fixed position and to the nozzle, which translation has an x-component and a y-component, the x-component being movement in a direction parallel to an x-axis, the y-component being movement in a direction parallel to a y-axis, and the x- and y-axes being perpendicular to each other, and
  (ii) during the translation, the print bed substantially rotates about an axis that is parallel to a z-axis, the z-axis being perpendicular to the x-axis and to the y-axis,
  (iii) during the translation, the material is deposited in a deposition direction, and
  (iv) the deposition direction is substantially constant relative to the nozzle throughout the entire translation; and
(e) a gas torch that is configured to heat the nozzle to a sufficiently high temperature to melt material that has built up on an exterior surface of the nozzle.

11. The system of claim 10, wherein:
(a) the material that is deposited has a deposition trajectory; and
(b) the deposition trajectory has multiple inflection points.

12. The system of claim 10, wherein the one or motors are configured to actuate the print bed in such a way that:
(a) the speed of the nozzle relative to the print bed is constant throughout the entire translation; and
(b) the angular velocity of the print bed varies during the translation.

13. The system of claim 10, wherein:
(a) during the translation, the material is deposited at impact points in a deposition trajectory; and
(b) the deposition trajectory, as a whole, has a shape that is neither a circle, nor a spiral, nor an involute of a circle, nor a segment of a straight line, nor a portion of a circle, nor a portion of a spiral, nor a portion of an involute of a circle.

14. The system of claim 10, wherein:
(a) the extruding fabricates a 3D object; and
(b) the system further comprises one or more computers that are programmed to transform coordinates of points in a virtual model of the 3D object into points in a trajectory of the print bed.

15. The system of claim 10, wherein:
(a) the translation of the print bed has an instantaneous direction, relative to the nozzle, at any given instant during the translation; and
(b) the instantaneous direction is not constant throughout the entire translation.

16. The system of claim 10, wherein:
(a) the material that is deposited during the translation comprises a filament; and
(b) after the filament is deposited, the filament has a constant width, such that the width is identical at different spatial points along the filament.

17. The system of claim 10, wherein:
(a) the material that is deposited during the translation comprises a filament; and
(b) after the filament is deposited, a cross-sectional region of the filament
  (i) corresponds to a particular region of an orifice of the nozzle, and
  (ii) is in a constant cross-sectional position of the filament, in different cross-sections of the filament.

18. The system of claim 11, wherein the speed of the nozzle relative to the print bed is constant throughout the entire translation.

* * * * *